United States Patent [19]
Coursey

[11] Patent Number: 5,950,130
[45] Date of Patent: Sep. 7, 1999

[54] MOBILE STATION WITH INTELLIGENT ROAMING AND OVER-THE-AIR PROGRAMMING FEATURES

[75] Inventor: Cameron Kelly Coursey, Austin, Tex.

[73] Assignee: SBC Technology Resources, Inc., Austin, Tex.

[21] Appl. No.: 08/828,172

[22] Filed: Mar. 18, 1997

[51] Int. Cl.[6] .................................................. H04Q 7/22
[52] U.S. Cl. .......................... 455/432; 455/419; 455/552
[58] Field of Search .................................. 455/432–435, 455/461, 550–552, 403, 422, 426, 419, 418

[56] References Cited

U.S. PATENT DOCUMENTS

| | | |
|---|---|---|
| 4,916,728 | 4/1990 | Blair . |
| 5,020,091 | 5/1991 | Krolopp et al. . |
| 5,093,926 | 3/1992 | Sasuta . |
| 5,101,500 | 3/1992 | Marui . |
| 5,159,625 | 10/1992 | Zicker . |
| 5,276,905 | 1/1994 | Hurst et al. . |
| 5,297,191 | 3/1994 | Gerszberg . |
| 5,297,192 | 3/1994 | Gerszberg . |
| 5,301,223 | 4/1994 | Amadon et al. . |
| 5,357,561 | 10/1994 | Grube . |
| 5,428,666 | 6/1995 | Fyfe et al. . |
| 5,442,806 | 8/1995 | Barber et al. . |
| 5,463,675 | 10/1995 | Gerszerg . |
| 5,504,803 | 4/1996 | Yamada et al. . |
| 5,524,135 | 6/1996 | Mizikovsky et al. . |
| 5,551,058 | 8/1996 | Hutcheson et al. . |
| 5,615,248 | 3/1997 | Norimatsu ................................ 455/566 |
| 5,642,398 | 6/1997 | Tiedemann, Jr. et al. .......... 455/435 X |
| 5,734,980 | 3/1998 | Hooper et al. ........................... 455/434 |
| 5,761,618 | 6/1998 | Lynch et al. ............................. 455/419 |

OTHER PUBLICATIONS

Update Note, *Recommendation GSM 02.11, Service Accessibilty*, Version 3.7.0, Released by ETSI/PT12, Nov. 1992.
Document Change Control Record, *Recommendation GSM 02.11–DCS, Service Accessibility*, Version 3.1.0, Released by ETSI/PT12, Nov. 1992.
Release Notes, *Recommendation GSM 02.11–DCS, Service Accessibility*, Version 3.0.1, Release 92, Phase 1, Released by ETSI/PT12 12 V, Feb. 1992.
*Stage 1 Description for System Selection for Preferred Roaming*, Version 1.7, Telecommunications Industries Association (TIA), TR45.5 Sub–Committee, Santa Barbara, CA, Feb. 9, 1996.
*System Selection for Preferred Roaming/Stage 2 & 3 Description*, Version 1.2, Telecommunications Industries Association (TIA), Enhanced Roaming Team, Feb. 9, 1996.

Primary Examiner—Dwayne D. Bost
Assistant Examiner—William G. Trost
Attorney, Agent, or Firm—Greenblum & Bernstein P.L.C.

[57] ABSTRACT

A method of intelligent roaming wherein a Systems Access List (SAL), programmed into the memory of a mobile station over-the-air or via a physical interface, is used to select a preferred system for service. When the mobile station is powered on, it scans the home band first, then a secondary band if a control channel is not found on the home band. If the mobile station determines that it is located in its home system, it remains on that band and obtains service from the home system. If the mobile station is not located within its home system, the SAL is searched to determine if there is a preferred system in the same area as the current system. If not, then the mobile station obtains service on the current system. If the SAL indicates there is a preferred system in the same area as the current system, then the SAL also indicates the exact band(s) where a preferred system may be located. The SAL may include information on the blocks of channels to scan. The SAL may indicate the air interface technology supported on each of the preferred bands, to assist the mobile station in finding a system of a given technology type. The SAL may include information for the mobile station to use in determining whether to display a roaming indicator and/or an alphanumeric name when operating on a given system.

73 Claims, 12 Drawing Sheets

MOBILE STATION WITH INTELLIGENT ROAMING AND OVER-THE-AIR PROGRAMMING FEATURES

BACKGROUND OF THE INVENTION

1. Field of the Invention

The present invention relates to the field of telecommunications. More particularly, the present invention relates to cellular or Personal Communications Services (PCS) network systems, and mobile stations having intelligent roaming and over-the-air programming features.

2. Acronyms

The written description provided herein contains acronyms which refer to, for example, various telecommunication services, components and techniques, as well as features relating to the present invention. Although some of these acronyms are known, use of these acronyms is not strictly standardized in the art. For purposes of the written description herein, acronyms will be defined as follows:

Advanced Mobile Phone Service (AMPS)
Analog Control Channel (ACC)
Base Station/Mobile Switching Center/Interworking Function (BMI)
Code Division Multiple Access (CDMA)
Complimentary Metal Oxide Semiconductor (CMOS)
Control Channel (CCh)
Customer Service Center (CSC)
Digital Control Channel (DCCH)
Digital Traffic Channel (DTC)
Electronically Erasable Programmable Read Only Memory (EEPROM)
Federal Communications Commission (FCC)
Group System for Mobile Communications (GSM)
Home Location Register (HLR)
International Mobile Station Identity (IMSI)
Intelligent Roaming Mode (IR Mode)
Interim Standard (IS)
Liquid Crystal Display (LCD)
Mobile Identification Number (MIN)
Mobile Station (MS)
Mobile Switching Center (MSC)
Mobile Telephone Switching Office (MTSO)
Number Assignment Module (NAM)
Over-the-Air Activation Function (OTAF)
Over-the-Air Activation Teleservice (OATS)
Personal Access Communication System (PACS)
Personal Communications Network (PCN)
Personal Communications Services (PCS)
Public Land Mobile Network (PLMN)
Public Switched Telephone Network (PSTN)
Random Access Memory (RAM)
System Access List (SAL)
System Identification Code (SID)
System Operator Code (SOC)
Transmission Control Protocol/Internet Protocol (TCP/IP)
Time Division Multiple Access (TDMA)

3. Background and Material Information

The use of wireless or mobile communication devices has increased greatly in recent years. Mobile and cellular telephones have enabled mobile station users to roam over large geographic areas while maintaining immediate access to telephony services. Mobile stations include portable units, units installed in vehicles and fixed subscriber stations. Mobile stations comprising cellular telephones or wireless handsets are operable in cooperation with cellular or Personal Communications Services (PCS) communications systems. Cellular communication systems typically provide service to a geographic area by dividing the area into many smaller areas or cells. Each cell is serviced by a radio transceiver (i.e., a transmitter-receiver base station or cell site). The cell sites or base stations may be connected to Mobile Telephone Switching Offices (MTSOs) or Mobile Switching Centers (MSCS) through landlines or other communication links, and the MTSOs may, in turn, be connected via landlines to the Public Switched Telephone Network (PSTN).

FIG. 1 illustrates the basic components of a conventional cellular network. As shown in FIG. 1, a mobile station 38 may place or receive calls by communicating with a cell site 30 or a cell site 40, depending upon the geographic location of the mobile station and the cell coverage area that is provided by each cell site (i.e., cell coverage area 35 of cell site 30 or cell coverage area 45 of cell site 40). For purposes of illustration, mobile station 38 is depicted in FIG. 1 as being able to communicate with either cell site 30 or cell site 40, even though the mobile station is not illustrated as being located within cell coverage area 35 or cell coverage area 45. Under normal operating conditions, the extent to which mobile station 38 will be able to communicate with cell site 30 or cell site 40 will depend on the geographic location of the mobile station and the size of the cell coverage area of each cell site. Further, although only two cell sites are depicted in FIG. 1, the entire cellular network may include, for example, more than two cell sites. In addition, more than one cell site may be connected to each MTSO.

Mobile station 38 may include a conventional cellular telephone unit with a transceiver and antenna (not shown) to communicate by, for example, radio waves with cell sites 30 and 40. Various air-interface technologies may be implemented to facilitate communication between the mobile station and the cell sites. Cell sites 30 and 40 may both include a radio transceiver (not shown) and be connected by landlines 16 or other communication links to MTSOs 24 and 28. The PSTN 12 is also connected to each MTSO 24 and 28 by landline 16 or other communication links.

The MTSOs 24 and 28 may be conventional digital telephone exchanges that control the switching between PSTN 12 and the cell sites 30 and 40 to provide wireline-to-mobile, mobile-to-wireline and mobile-to-mobile call connectivity. The MTSOs 24 and 28 may also (i) process mobile station status data received from the cell site controllers; (ii) handle and switch calls between cells; (iii) process diagnostic information; and (iv) compile billing information. The transceiver (not shown) of each cell site 30 and 40 provides communications, such as voice and data, with mobile station 38 while it is present in its geographic domain. The MTSOs 24 and 28 may track and switch mobile station 38 from cell site to cell site, as the mobile station passes through various coverage areas. When mobile station 38 passes from one cell to another cell, the MTSO of the corresponding cell may perform a "hand-off" that allows the mobile station to be continuously serviced.

In the current North American cellular system, any given area may be serviced by up to two competing service providers of cellular air time communication services. By Federal Communications Commission (FCC) regulations, the two competing service providers are assigned different groups of frequencies through which services are provided. A frequency set typically includes control channels and voice channels. The control channels are used for preliminary communications between a mobile station and a cell site for setting up a call, after which a voice channel is assigned for the mobile station's use on that call. The assigned frequency sets are generally referred to as "A band frequencies" and "B band frequencies". Typically, the A band frequencies are reserved for non-wireline service providers, while the B band frequencies are reserved for wireline service providers. While each frequency set for a given cellular service area is assigned to only one service provider, in different service areas the same frequency set may be assigned to different service providers or companies.

Depending upon which service provider is subscribed to by the user of the mobile station, the home frequency set of the user may correspond to the A frequency band or the B frequency band. Whenever a call is placed by the mobile station, the unit will ordinarily attempt to use the home frequency set to establish the call. If a call is handled outside of the user's home network area, then the unit is said to be "roaming" and service will be attempted through a frequency set of a non-home service provider. Typically, the user's home service provider will have a roaming agreement or -reciprocal billing arrangement with the non-home service provider to permit service to be extended to the user's mobile unit when it is roaming in the non-home service provider's service area.

The mobile station may include a memory device, such as a number assignment module (NAM), in which an assigned phone number and a system identification code (SID) is stored to uniquely identify the home service provider for the unit. In the North American cellular system, each cellular market or provider is assigned a distinct, fifteen bit SID. In Europe, on the other hand, the Global System for Mobile Communications (GSM) standard (see, for example, *Recommendation GSM 02.11, Service Accessibility*, European Telecommunications Standards Institute, 1992) defines a process for network selection based on the mobile station reading the GSM equivalent of the SID, called the Public Land Mobile Network (PLMN) identity. The SID or equivalent system identification number is broadcast by each service provider or cellular provider and is used by the mobile station to determine whether or not the mobile station is operating in it's home network or if it is operating in a roaming condition. The mobile station makes this determination by reading the SID that is broadcasted in the cellular market in which it is located, and comparing it to the home SID stored in the NAM of the cellular phone unit. If the SIDs do not match, then the mobile station is roaming, and the mobile station must attempt to gain service through a non-home service provider. Due to the imposition of a fixed surcharge or higher per unit rate, the air time charges when the mobile station is roaming are customarily higher than when it is operating within its home network.

Operation under a roaming condition is often under the control of the mobile station user. The user can select whether the mobile station will operate in a Home System Only, A Band Only, B Band Only, A Band Preferred, or B Band Preferred operating mode. The user typically controls the system preference and mode operation through menu choice or selection. This current method of roaming control is conventionally known as "Preferred System Selection". In the most common roaming situation, the mobile station remains on the same band as the home cellular network. That is, if the mobile station is homed to a cellular network with an odd numbered SID (which is normally assigned to an A band cellular service provider), then the mobile station will obtain service from the A band cellular service provider when roaming.

Occasionally, the home service provider will program a mobile station with negative SIDs. Negative SIDs correspond to SIDs on which the mobile station should not obtain service. Negative SIDs may be used, for example, if roaming agreements are not in place between different cellular service providers. An example of a mobile station that utilizes negative SIDs is disclosed in BLAIR, U.S. Pat. No. 4,916,728. As an alternative to negative SIDs, some mobile stations are programmed with positive or preferred SIDs. Positive or preferred SIDs are SIDs on which the mobile station should attempt to obtain service when selecting a cellular carrier frequency. An example of a mobile station that utilizes preferred SIDs is disclosed in BARBER et al., U.S. Pat. No. 5,442,806. The use of preferred SIDs facilitate the selection of a preferred service provider when the mobile station is roaming.

Presently, there is a need in the cellular and mobile network industries to provide some form of "intelligent" or "automatic" roaming in which the mobile station obtains service on the cellular network with which the home cellular service provider has the best roaming agreement (or the cellular service provider's own network in the roaming area, if it is not in the same band as the home system). There are three factors that have primarily led to this need. First, large cellular service providers rarely operate in the same band in all markets. Secondly, cellular service providers have chosen to implement three distinct technologies at 800 MHz (i.e., Analog Only, Time Division Multiple Access (TDMA), and Code Division Multiple Access (CDMA)), and the mobile station may have to change bands to obtain service on the preferred technology. Third, with the advent and development of Personal Communications Services (PCS), there is an increasing desire for roaming to, for example, 1900 MHz PCS systems.

As will be appreciated by those skilled in the art, PCS covers a broad range of individualized telecommunication services that let users communicate irrespective of where they are located. With PCS, personalized numbers are assigned to individuals rather than to the mobile stations, and call completion is performed regardless of the location of the user. PCS may be implemented through conventional macrocellular techniques or through Personal Communications Networks (PCN) that utilize light, inexpensive handheld handsets and communicate via low-power antennas that are intended to operate in a similar fashion to that of large scale cellular telephone networks, but operate within small geographic or microcellular areas. It is anticipated that PCNs will operate within the same frequency band in most countries (e.g., 1850–1990 Mhz), while cellular systems will operate in different frequency bands in various countries.

In the marketplace today, there is also a need to provide intelligent roaming capabilities in order to reduce scanning and acquisition time, and to permit a mobile station to more quickly determine which system it should obtain service on prior to registration. In conventional systems, including systems that utilize negative or preferred SIDs, the mobile station will typically scan a plurality or all of the available frequency bands before determining the preferred carrier for a present service locality. It would be desirable to provide intelligent roaming capabilities for a mobile station to reduce the time and amount of scanning that is required by the mobile station when seeking a non-home network service provider. Prior systems do not provide, for example, sufficient intelligence in the mobile station to efficiently direct the mobile station to the particular band or bands where the mobile station may obtain service on a preferred system when it is roaming.

Further, there is a need to provide intelligent roaming capabilities for a mobile station which will not require any changes to present network interface standards (e.g. IS-41) or air interface standards (e.g., IS-136, IS-91A, IS-95), and which is independent of air interface technologies (e.g., Advanced Mobile Phone Service (AMPS), TDMA, CDMA, Personal Access Communication System (PACS) and PCS-1900 MHz). Such features are desirable in order to permit new intelligent roaming capabilities to be readily utilized by a mobile station and to allow seamless integration of such capabilities without modification to present industry standards. For more information on network interface standards such as Interim Standard 41 (IS-41), see, for example, TIA/EIA-IS-41.5-C, *Cellular Radiotelecommunications Intersystem Operations: Signaling Protocols*, Telecommunications Industry Association, February 1996. For more information on air-interface standards such as Interim Standards 95 and 136 (IS-95 and IS-136), see, for example, TIA/EIA-IS-95-A, *Mobile Station-Base Station Compatibility Standard for Dual-Mode Wideband Spread Spectrum Cellular Systems*, Telecommunications Industry Association, May 1995; TIA/EIA-IS-136.1-A, *TDMA Cellular/PCS-Radio Interface-Mobile Station-Base Station Compatibility-Digital Control Channel*, Telecommunications Industry Association, October 1996; TIA/EIA-IS-136.2-A, *TDMA Cellular/PCS-Radio Interface-Mobile Station-Base Station Compatibility-Traffic Channels and FSK Control Channel*, Telecommunications Industry Association, October 1996; and TIA/EIA/IS-136.1-A-1, *Addendum No. 1 to TIA/EIA/IS-136.1-A*, Telecommunications Industry Association, November 1996.

Another desirable feature is to provide over-the-air programming of a mobile station to permit reprogramming of the mobile station with new intelligent roaming information as it becomes available. Such a feature would permit the "intelligence" that is incorporated into the mobile station to be updated and stored with ease, without requiring the user to bring the mobile station to a technician or operator for reprogramming.

SUMMARY OF THE INVENTION

In view of the foregoing, the present invention, through one or more of its various aspects, embodiments and/or specific features or subcomponents thereof, is thus intended to bring about one or more of the objects and advantages as discussed below.

An object of the present invention is to provide a mobile station having intelligent roaming capabilities, such that the mobile station can readily obtain service on a preferred system when its home network system is not available.

Another object of the present invention is to program a mobile station with sufficient intelligence to allow the mobile station to rapidly obtain service on a preferred cellular or PCS system when there are multiple bands and multiple technologies available.

Still another object of the present invention is provide a mobile station with a System Access List (SAL) that directs the mobile station to the exact band or bands where a preferred system may be located. Further, an object of the present invention is to provide an SAL that includes information on the air interface technology on each preferred band to assist the mobile station in finding a system of a given technology type.

Yet another object of the present invention is to reduce the amount of scanning required by a mobile station when operating in a "roaming" state. An object of the present invention is to provide a mobile station that has sufficient intelligent roaming capabilities, such that the mobile station is capable of readily obtaining service on the cellular or PCS network system with which its home system has the best roaming agreement or billing arrangement.

Another object of the present invention is to provide an intelligent roaming process, wherein a System Access List (SAL) is searched by a mobile station when the mobile station is not operating in its home system, and wherein the SAL indicates the band(s) and/or channel(s) where the mobile station can scan and locate a preferred system when the current system is not a preferred system for that area. The SAL may also contain information for the mobile station to use in determining whether to display a roam icon or indicator, and what alphanumeric system name to display when operating in a given system.

Further, an object of the present invention is to provide a mobile station having over-the-air programming capabilities. According to an object of the invention, the over-the-air programming capabilities may allow a System Access List (SAL), containing intelligence for roaming, to be stored and updated in memory of a mobile station by interfacing with the mobile station over the air.

According to one embodiment of the present invention, a mobile station is provided with intelligent roaming capabilities. The mobile station, which may be implemented as a mobile, cellular or PCS telephone unit, includes a System Access List (SAL) that is stored in a memory of the mobile station. When the mobile station is initialized (e.g., when the mobile station is powered ON, changes systems or SID area, operates in a "No Service" condition, or an Intelligent Roaming mode (IR Mode) is selected), the mobile station first scans the band of its home system. If the mobile station determines that it is located in its home system (e.g., by analyzing the SID of the current system), the mobile station remains on that band and obtains service from the home system. If the mobile station cannot find a control channel on the home band, then it may scan a secondary band in which the mobile station is guaranteed to find a control channel.

If the mobile station finds a control channel on its home band (but not in its home system) or the secondary band, the SAL is searched to determine whether the current system is a preferred system. This may be performed by comparing the SID of the current system with the entries and information in the SAL. If the SAL indicates that the current system is a preferred system, then the mobile station obtains service on the current system. If the current system is not the preferred system, then the SAL indicates or directs the mobile station to the exact band or bands where a preferred system may be located for that area. The SAL may also indicate the air interface technology supported on each of the preferred bands to assist the mobile station in finding a system of a given technology type.

According to an aspect of the present invention, the SAL that is stored in the mobile station may include information on the blocks of channels to scan in the preferred bands. The SAL contains sufficient intelligence to direct the mobile station to the exact band(s) and/or channel(s) where the most preferred systems are located when the mobile station is roaming. As a result, the mobile station may quickly obtain service on the preferred system in any area where there is cellular or PCS coverage.

According to an aspect of the invention, an intelligent roaming process is provided for enabling a mobile station to locate a preferred system within a communication network when a home system of the mobile station is not available. The communication network may comprise a plurality of service areas, wherein each of the service areas are assigned a system identification number. The intelligent roaming process may include: accessing, when the home system is not available, a system access list (SAL) stored in the mobile station; comparing a system identification number of the current service area to the SAL to determine if a preferred system exists for the current service area; and identifying, when a preferred system is determined to exist for the current service area, a frequency band where the mobile station can locate the preferred system for the current service area.

The SAL may include a plurality of entries indicating a system identification number and corresponding frequency band for each preferred system. The entries of the SAL may also include air interface technology information that indicates the air interface technology used by each preferred system. According to the intelligent roaming process of the invention, the entries of the SAL may be searched based on the system identification number of the current service area, and a preferred system may be determined to exist when a system identification number of one of the entries corresponds to the system identification number of the current service area. When a preferred system is determined not to exist for the current service area, a "No Service" indication may be displayed to the mobile station user.

According to another aspect of the invention, the intelligent roaming process may further comprise scanning a home frequency band for a control channel and additionally scanning, when a control channel is not located on the home frequency band, a secondary frequency band where the mobile station can locate a control channel. The intelligent roaming process may also include programming the mobile station with the SAL over-the-air with a wireless interface, wherein the over-the-air programming includes storing the SAL in a memory of the mobile station. In order to perform over-the-air programming, the SAL information may be transmitted as information elements that are made part of an Over-the-Air Activation Teleservice (OATS). Over-the-air programming may also be achieved by embedding the SAL information within a System Operator Code (SOC) Specific Request message defined for OATS.

In accordance with another aspect of the present invention, a process for selecting a preferred system within a communication network may be provided, wherein the process includes: scanning a home band to locate a control channel; obtaining, when the control channel is located, a system identification number corresponding to a current service area in which the mobile station is located; determining whether the home system is available based on the system identification number of the current service area; accessing, when the home system is not available, a system access list (SAL) stored in the mobile station, the SAL comprising a plurality of entries indicating a system identification number and a corresponding frequency band for each preferred system; comparing the system identification number of the current service area to the entries of the SAL to determine whether a preferred system exists for the current service area; and identifying, from the entry that corresponds to the system identification number of the current service area, a frequency band where the mobile station can locate a preferred system for the current service area.

The process for selecting a preferred system, according to the invention, may also include scanning, when a current frequency band in which the control channel is located does not correspond to an identified frequency band of the preferred system, the identified frequency band to obtain service on the preferred system for the current service area. In addition, the process may include obtaining service on the current frequency band when the current frequency band corresponds to the identified frequency band of the preferred system for the current service area.

An intelligent roaming system is also provided, in accordance with an aspect of the invention, to enable a mobile station to select a preferred system within a communication network when a home system of the mobile station is not available. The intelligent roaming system may comprise: a system for accessing, when the home system is not available, a system access list (SAL) stored in the mobile station; a system for comparing the system identification number of the current service area to the SAL to determine if a preferred system exists for the current service area; and a system for identifying, when a preferred system is determined to exist for the current service area, a frequency band where the mobile station can locate the preferred system for the current service area.

The SAL that is stored in the mobile station may comprise a plurality of entries indicating a system identification number and corresponding frequency band for each preferred system. The comparing system may include a system for searching the entries of the SAL based on the system identification number of the current service area, and a system for determining that a preferred system exists when a system identification number of one of the entries corresponds to the system identification number of the current service area. According to the invention, each of the SAL entries may also contain air interface technology information that indicates the air interface technology used by each preferred system.

The intelligent roaming system of the invention may also comprise a system for scanning, after the frequency band of the preferred system for the current service area is identified, the identified frequency band in order to obtain service on the preferred system for the current service area. In addition, a detecting system may be provided for detecting the system identification number of the current service area within which the mobile station is located, and a determining system may be provided for determining whether the home system is available based on the system identification number of the current service area. The detecting system may comprise a system for scanning a home frequency band for a control channel and system for additionally scanning, when a control channel is not located on the home frequency band, a secondary frequency band where the mobile station can locate a control channel.

According to the present invention, the mobile station may comprise a mobile phone and the communications network may comprise a cellular communications network or a Personal Communications Services (PCS) network. The intelligent roaming system may also include a system for programming the mobile station with the SAL over-the-air with a wireless interface, wherein the over-the-air programming system includes system for storing the SAL in a memory of the mobile station. The over-the-air programming system may further comprise a system for transmitting SAL information as information elements that are made part of an Over-the-Air Activation Teleservice (OATS). In addition, the over-the-air programming system may further comprise a system for embedding SAL information within a System Operator Code (SOC) Specific Request message defined for OATS.

According to yet another aspect of the invention, a system is provided for selecting a preferred system within a communication network when a home system is not available to a mobile station. The system of the present invention comprises: a system for scanning a home band to locate a control channel; a system for obtaining, when the control channel is located, a system identification number corresponding to a current service area in which the mobile station is located; a system for determining whether the home system is available based on the system identification number of the current service area; a system for accessing, when the home system is not available, a system access list (SAL) stored in the mobile station, the SAL comprising a plurality of entries indicating a system identification number and corresponding frequency band for each preferred system; a system for comparing the system identification number of the current service area to the entries of the SAL to determine whether a preferred system exists for the current service area; and a system for identifying, from one of the entries of the SAL that corresponds to the system identification number of the current service area, a frequency band where the mobile station can locate a preferred system for the current service area.

The comparing system may comprise a system for determining that a preferred system exists when a system identification number of one of the entries corresponds to the system identification number of the current service area. The system may also include a system for scanning, when a current frequency band in which the control channel is located does not correspond to an identified frequency band of the preferred system, the identified frequency band to obtain service on the preferred system for the current service area. In addition, the system may comprise a system for obtaining service on the current frequency band when the current frequency band corresponds to the identified frequency band of the preferred system.

In addition, in accordance with the invention, the mobile station may comprise a mobile phone and the communications network may comprise a cellular communications network or a Personal Communications Services (PCS) network. The intelligent roaming system may also include a system for programming the mobile station with the SAL over-the-air with a wireless interface, wherein the over-the-air programming system includes system for storing the SAL in a memory of the mobile station.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

Referring to the accompanying drawings, a detailed description of the preferred embodiments and features of the present invention will be provided.

The present invention relates to a mobile station with intelligent roaming and/or over-the-air programming features. The present invention permits a mobile station to rapidly obtain service on a preferred cellular or PCS system, when there are multiple bands and multiple air-interface technologies available. According to an aspect of the present invention, a System Access List (SAL) is stored within a memory or storage device of the mobile station. When the mobile station is roaming, the SAL may be accessed to indicate the band or bands where the mobile station will find a preferred system. The SAL may also include information to indicate the air-interface technology supported on each of the preferred bands, to assist the mobile station in finding a system of a given technology type. According to another aspect of the present invention, programming of the SAL in the mobile station may be performed over the air (i.e., by wireless communication) to permit easy reprogramming of the mobile station with new preferred system information as it becomes available.

These and other features and aspects of the present invention will now be described in greater detail with reference to the accompanying drawings.

Figure 1:
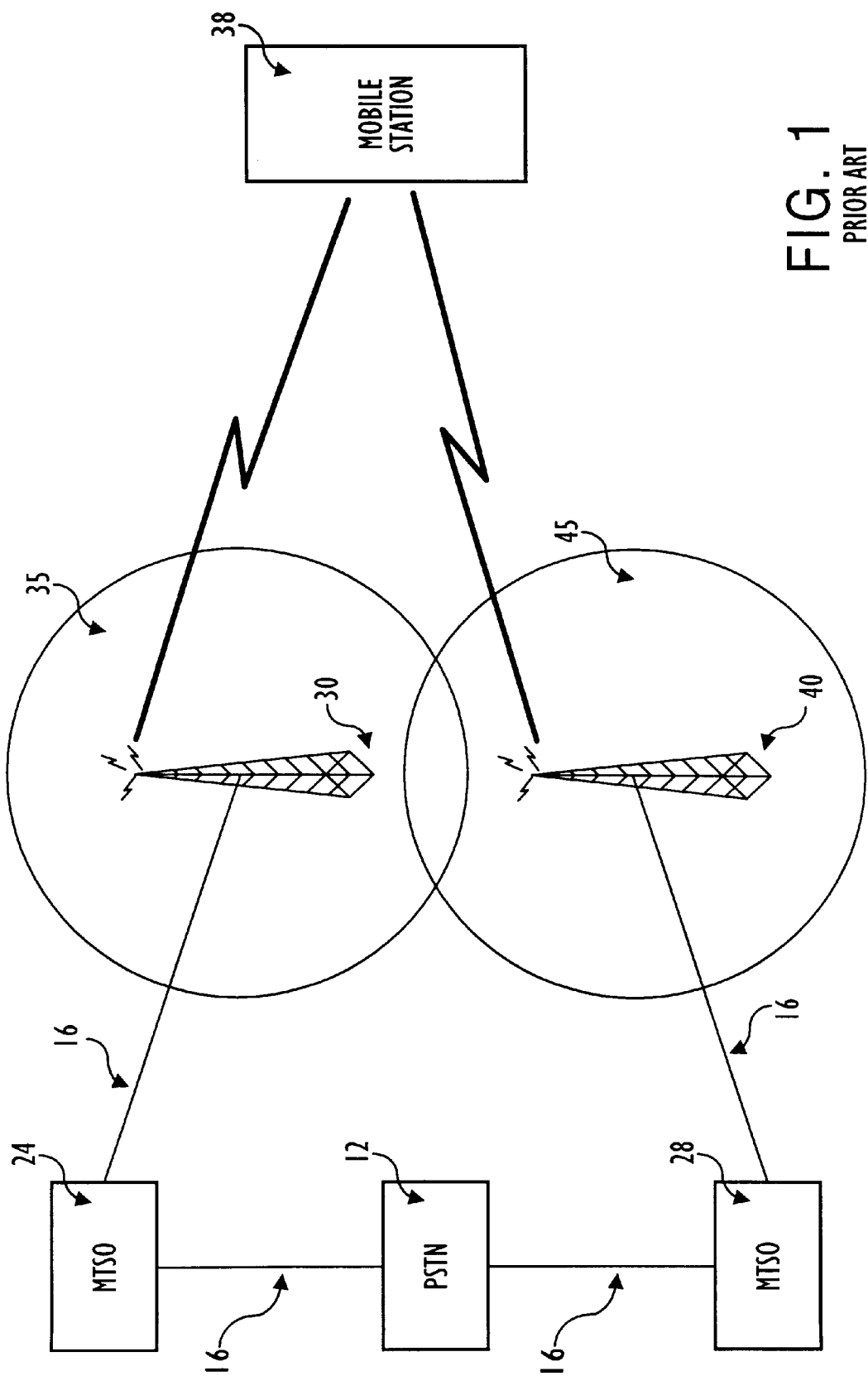
FIG. 1 illustrates the basic components of a conventional cellular network system.
Figure 2A:
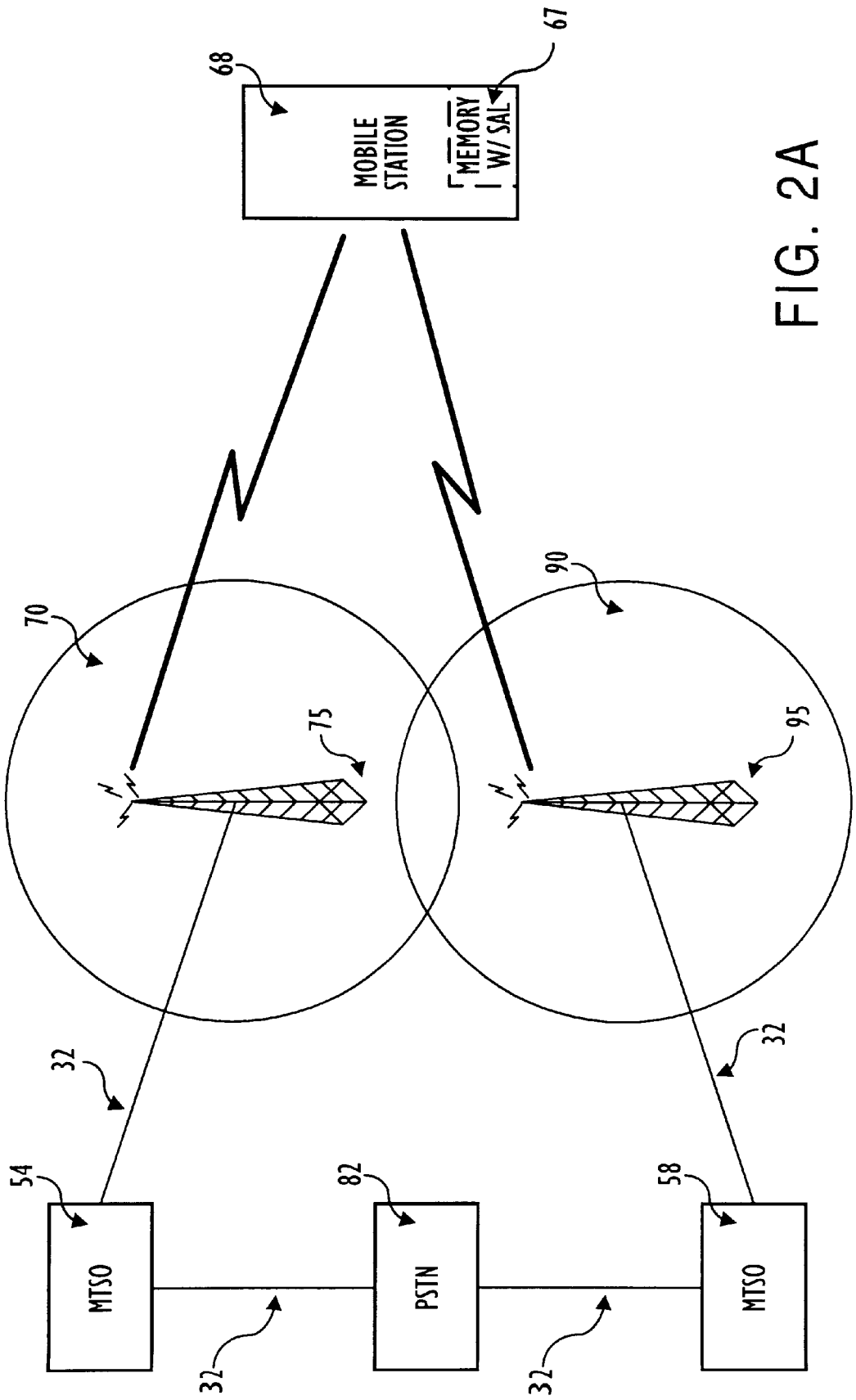
FIG. 2A illustrates exemplary components of a cellular or PCS network system implemented according to aspects of the present invention.
Figure 2B:
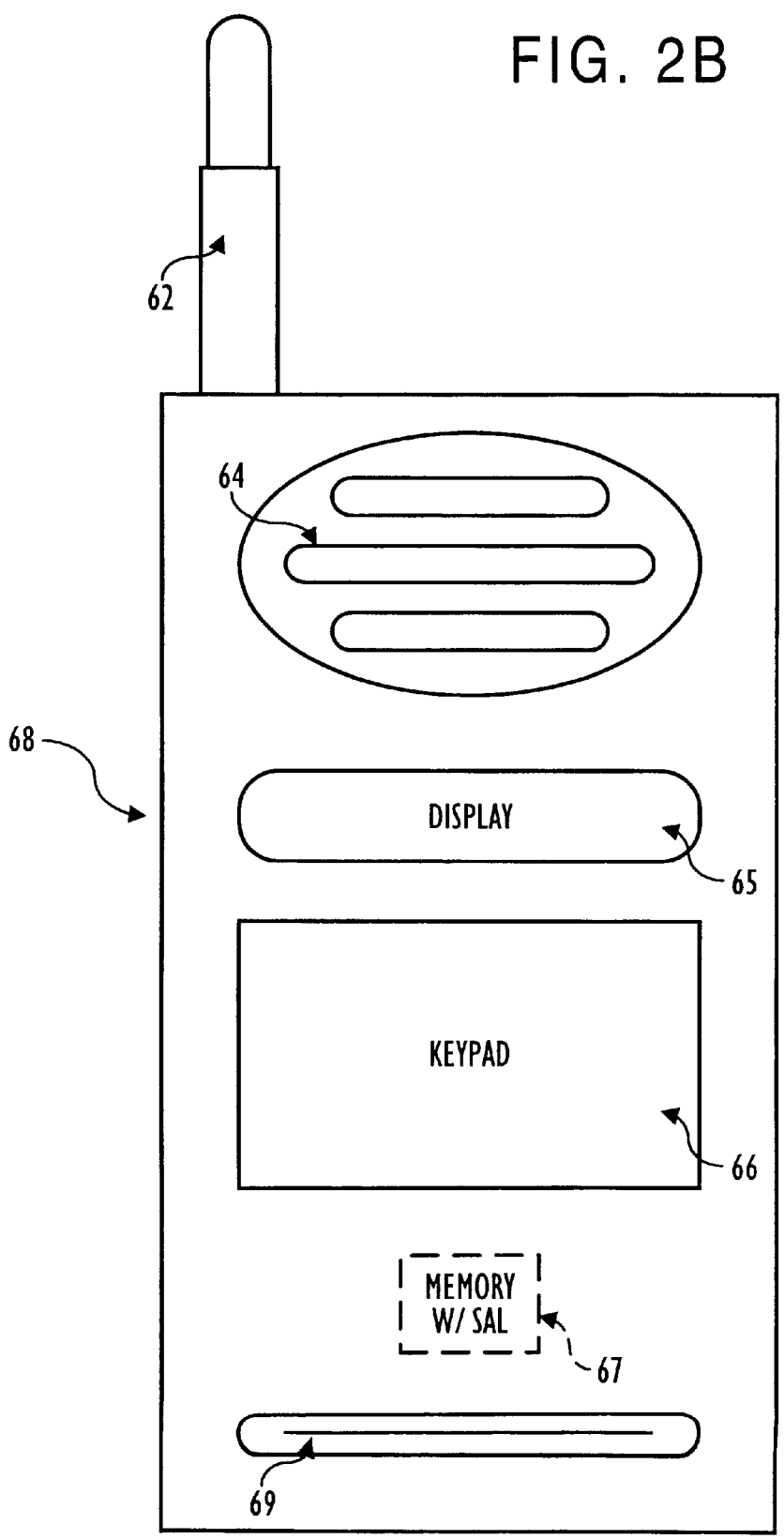
FIG. 2B illustrates, in accordance with an aspect of the present invention, an exemplary mobile station implemented as a cellular telephone unit.
Figure 2C:
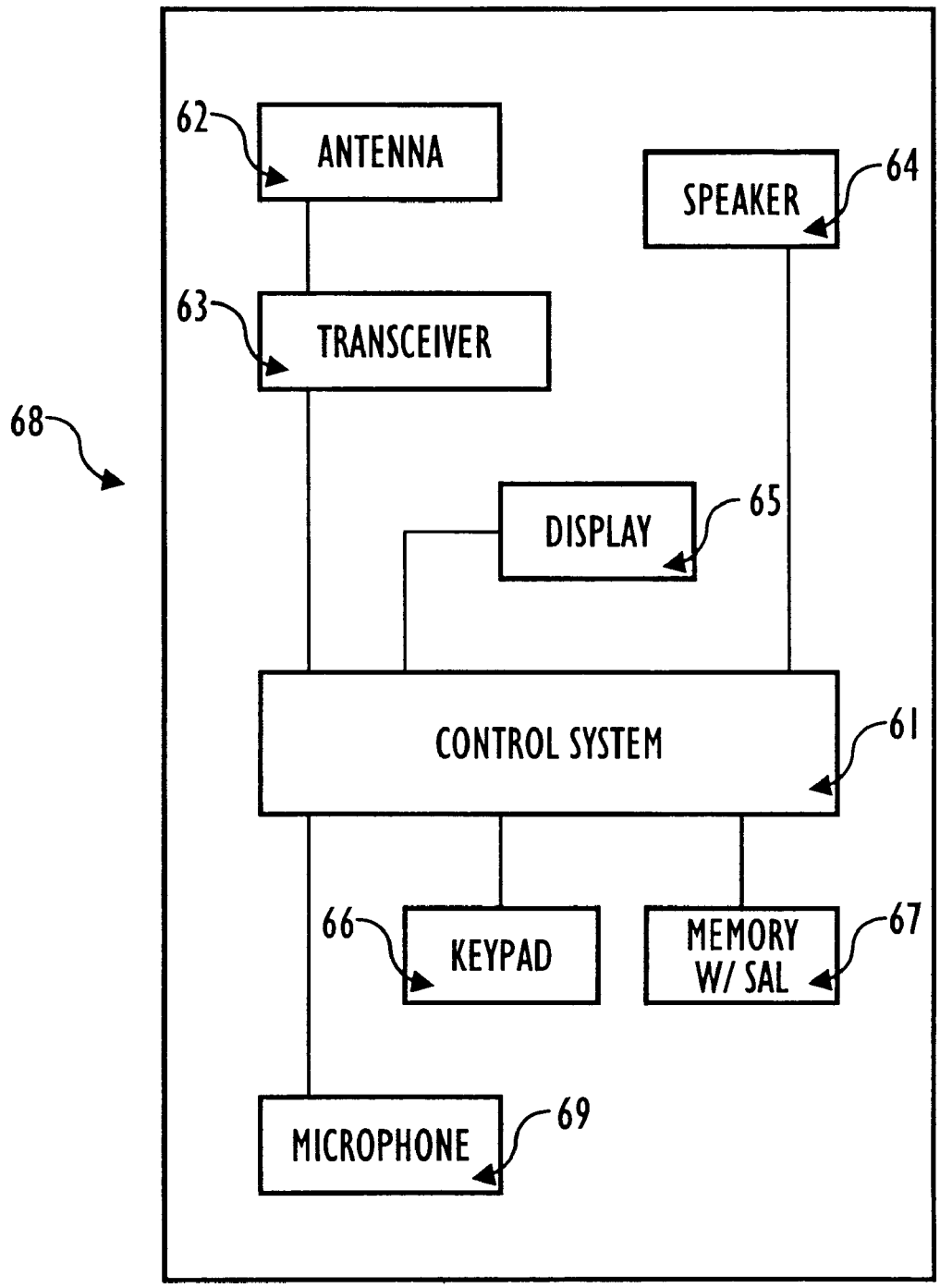
FIG. 2C is a general block diagram of the components of the mobile station of FIG. 2B, in accordance with an aspect of the present invention.

FIGS. 2A–2C illustrate an exemplary network architecture and exemplary system components for implementing the intelligent roaming capabilities of the present invention. In FIGS. 2A–2C, a mobile station-based approach is provided for implementing the intelligent roaming capabilities of the invention. According to the mobile-station approach of the invention, each mobile station is programmed with intelligent roaming capabilities so that it can determine which system it should obtain service on prior to registration. As will be appreciated from the following description, the mobile station-based approach for providing intelligent roaming capabilities has several advantages, including the ability to integrate into conventional cellular or PCS network environments without requiring modification to the main network components, and without requiring any changes to current network interface standards (e.g., IS-41) or air interface standards (e.g., IS-136, IS-91A, IS-95). The present invention also reduces acquisition time during roaming by eliminating lengthy scans by the mobile station prior to obtaining service.

In FIG. 2A, exemplary components of a cellular network implemented with the features of the present invention are illustrated. Although the present invention is described with reference to a cellular network environment, the present invention may also be applied to a PCS or PCN network environment, in which lower powered cell sites and smaller cell areas are utilized. In FIG. 2A, a mobile station 68 is provided with a memory device 67 for storing a System Access List (SAL). According to an aspect of the present invention, the SAL may be preprogrammed into the mobile station prior to activation of the unit and/or may be reprogrammed and updated by using, for example, a physical interface (such as a computer interface) or over-the-air programming techniques, such as those discussed below. The SAL may indicate the band or bands where a mobile station may find a preferred system when roaming. That is, the SAL may include information on blocks of channels to scan in the preferred bands, so that the mobile station may quickly obtain service on the preferred system in any area where there is cellular coverage. The SAL may also include information for the mobile station to use in determining whether to display a roam icon, and what alphanumeric system name to display when operating on a given system. Air-interface technology information may also be provided in the SAL to indicate which air interface technologies are supported on each of the preferred bands and to facilitate the mobile station in finding a system of a given technology type.

The mobile station 68 may comprise portable phone units, units installed in vehicles and fixed subscriber units. By way of non-limiting example, the mobile station 68 may be implemented as a cellular telephone unit with a transceiver and antenna (see, for example, FIGS. 2B and 2C) to communicate by, for example, radio waves with one or more cell sites. In FIG. 2A, cell sites 75 and 95 are illustrated. The mobile station 68 may place or receive calls by communicating with cell site 75 or cell site 95, depending upon the location of the mobile station and the cell coverage area that is provided by each cell site. That is, when mobile station 68 is located within cell coverage area 70 it may communicate with cell site 75, and when it is located within cell coverage area 90 it may communicate with cell site 95. As will be appreciated by those skilled in the art, the actual cell coverage area for a cell site will depend upon various factors, including the power of the transceiver of the cell site, the placement and location of the cell site, and the topography of the locality and surrounding areas where the cell site is located. Further, although only two cell sites are depicted in FIG. 2A, the cellular network may of course include more than two cell sites. Moreover, it should be noted that the various components of the cellular network depicted in FIG. 2A are provided for the purpose of illustration only, and that other type of network arrangements may of course be provided to implement the features of the invention. In addition, more that one cell site may of course be served by each MTSO.

Various air-interface technologies (e.g., TDMA, CDMA, PACS, and PCS-1900 MHz) may be utilized to facilitate communication between the mobile station and the cell sites. Each of the cell sites 75 and 95 may include, for example, a radio transceiver (not shown) and be connected by landlines 32 or other communication links to Mobile Switching Centers (MSCs) or Mobile Telephone Switching Offices (MTSOS) 54 and 58. Landlines 32 may also be utilized to connect the MTSOs 54 and 58 to Public Switch Telephone Network (PSTN) 82.

The MTSOs 54 and 58 may be conventional digital telephone exchanges that control the switching between PSTN 82 and the cell sites 75 and 95 to provide wireline-to-mobile, mobile-to-wireline and mobile-to-mobile call connectivity. The MTSOs may provide various functions, including (i) processing mobile station status data received from the cell site controllers, (ii) handling and switching calls, (iii) processing diagnostic information, and (iv) compiling billing information. The transceiver (not shown) of each cell site 75 and 95 may provide communication services, such as voice and data communication, with mobile station 68 while it is present in its cell coverage area. Tracking and switching of the mobile station from cell site to cell site may be handled by the MTSOs, as the mobile station passes through various cell coverage areas. When, for example, mobile station 68 passes from one cell to another cell, the MTSO of the corresponding cell may perform a "hand-off" that allows the mobile station to be continuously serviced.

As shown in FIG. 2B, the mobile station 68 may be implemented as a cellular telephone unit that comprises an antenna 62, a speaker 64, a microphone 69, a display 65, and a keypad 66 for entering alphanumeric information. The cellular telephone unit of mobile station 68 may be constructed in a similar fashion to that of a conventional cellular telephone, with the exception of unique programming and memory configurations and contents for implementing the intelligent roaming aspects of the present invention. Further, the memory 67 of the mobile station 68 may be configured to handle a greater capacity than that of a conventional cellular telephone, in order to accommodate the SAL and other operational information of the present invention.

Accordingly, mobile station 68 may include a speaker 64 that comprises a conventional speaker for converting electrical audio signals received by antenna 62 into acoustic audio signals, and a microphone 69 that comprises a conventional microphone for converting voice utterances of a user from acoustic audio signals into electrical audio signals for transmission by antenna 62. In addition, display 65 and keypad 66 may be implemented by conventional display and keypad devices for displaying and permitting entry of alphanumeric and other information. By way of a non-limiting example, display 65 may comprise dedicated status lights and/or a liquid crystal display (LCD) to indicate the status of the cellular telephone unit (e.g., "No Service", "Roam", etc.). Further, keypad 66 may comprise menu selection buttons and/or a conventional twelve button, alphanumeric keypad for initiating and receiving calls, and programming or selecting operating conditions for the mobile station.

Memory 67 of the mobile station 68 may store the SAL and other operational information of the present invention. Memory 67 may comprise a read-write memory device that has an independent power supply or whose contents will not be effected by power downs of ordinary duration. By way of non-limiting examples, memory 67 may be implemented by a programmable Electronically Erasable Programmable Read Only Memory (EEPROM), a Complimentary Metal Oxide Semiconductor (CMOS) memory chip, or a conventional Random Access Memory (RAM) with an independent power supply.

An exemplary block diagram representation of the components of the mobile station 68 depicted in FIG. 2B is provided in FIG. 2C. As discussed above, the cellular telephone unit of the mobile station 68 may comprise an antenna 62, a speaker 64, a display 65, a keypad 66, and a microphone 69. The antenna 62 may be connected to a transceiver 63, which in turn is connected to a control system 61. Control system 61 may be implemented as a microprocessor-based, control system and may be programmed to carry out the intelligent roaming features and logic of the present invention. The programming of control system 61 may be carried out by any suitable combination or use of software, hardware and/or firmware. Control system 61 may control the various components of the mobile station 68 to permit a user to send and receive calls and program the mobile station. In addition, control system 61 may have access to memory 67, in which the SAL and other programming information is stored, for directing operation of the mobile station. A more detailed description of the various processes and functions of the intelligent roaming features of the present invention, as well as the logic steps associated with the intelligent roaming method, is provided below with reference to the accompanying drawings.

Figure 3:
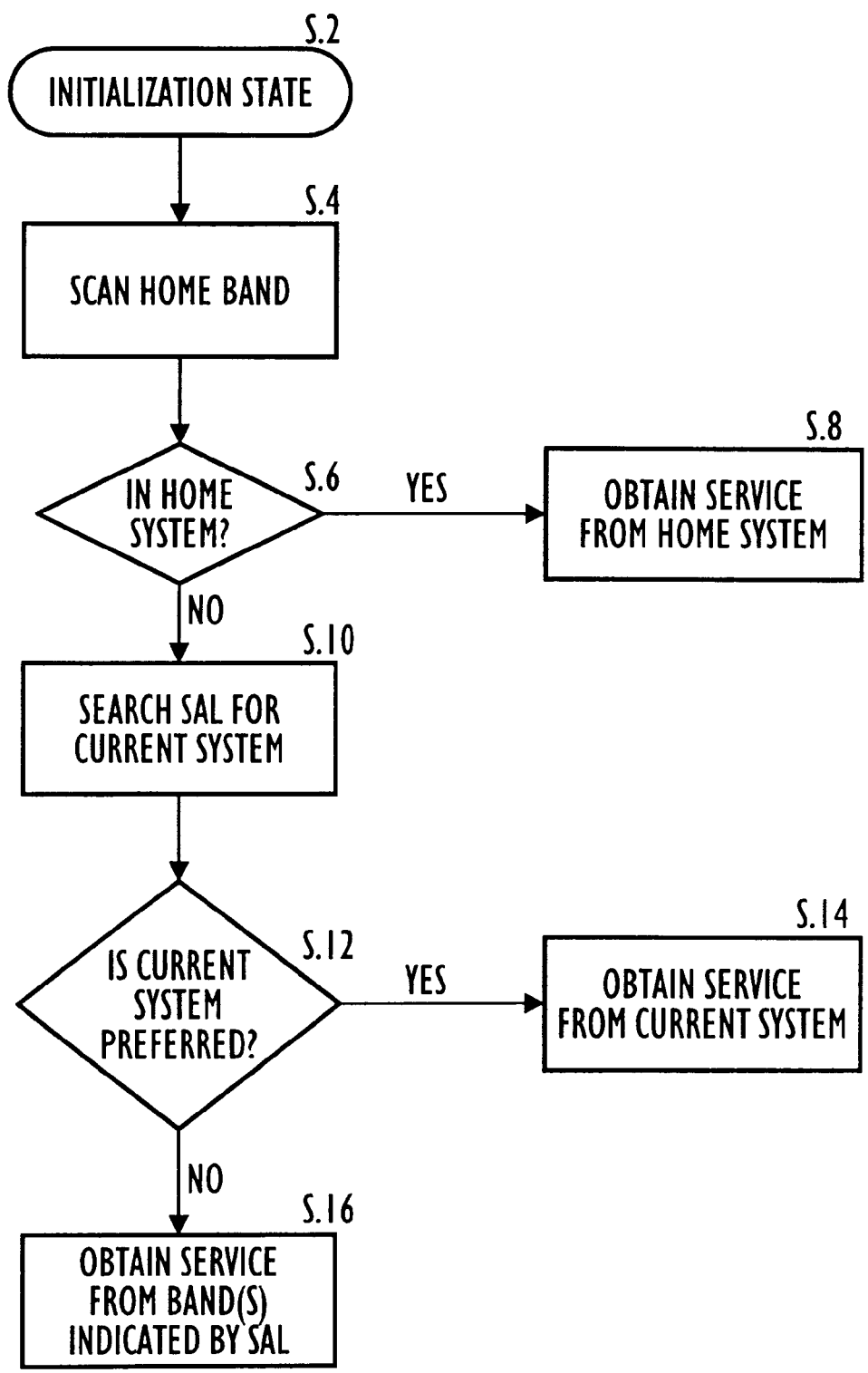
FIG. 3 is a flow diagram of the processes and operations of an intelligent roaming process, according to an embodiment of the invention.

Referring now to FIG. 3, an exemplary logic flow diagram of the intelligent roaming process or method of the present invention will be discussed, in accordance with an embodiment of the present invention. The various processes and operations illustrated in FIG. 3 may be carried out by control system 61 of the mobile station 68 through the use of programmed logic or firmware. The intelligent roaming process of the present invention permits each mobile station to automatically obtain service on the most appropriate and/or preferred cellular system. Although the description below is made with reference to a cellular network environment, the various processes and operation may also be applied to PCS or PCN network systems.

In FIG. 3, a mobile station enters an initialization state at step S.2, when the mobile station is powered ON, changes systems, is in a "No Service" condition, or when an Intelligent Roaming mode (IR Mode) has been selected by the user. After the mobile station has been initialized, the mobile station first scans for its home band (i.e., the set of frequencies corresponding to its home network system) at step S.4 to locate a control channel. The set of frequencies corresponding to the home band of the mobile station may be programmed into the mobile station's memory (e.g., memory 67) by the home system service provider.

At step S.6, the mobile station determines whether it is in its home system. Whether or not the mobile station is located in its home system may be determined by analyzing the SID or equivalent system identification number of the cellular service provider for the area in which the mobile station is located. By comparing the SID received on the control channel with the home SID of the home service provider, the mobile station may determine whether it is located in its home system. As described above, the home SID may be stored in the NAM of the mobile station, or may be stored in another appropriate memory or storage device of the mobile station. For example, the home SID may be stored separately from the SAL of the mobile station, or may be stored in memory 67 as part of the SAL.

If the mobile station determines that it is located in its home system, then at step S.8, the mobile station will stay on that band and obtain service from the home service network provider. However, if the mobile station determines that it is not in its home system, then at step S.10 the SAL stored in the mobile station will be accessed and searched to determine if a preferred network provider exists for the current system. In accordance with an aspect of the present invention, the SAL stored in the mobile station may comprise a table of entries including the SIDs and corresponding frequency band(s) of all of the preferred service providers. The preferred service providers may correspond to cellular service providers that the mobile station's home system has a reciprocal agreement or billing arrangement with to provide service when the mobile station is roaming. Entries in the SAL may be provided for the SIDs associated with each region within which one or more preferred service providers exist (e.g., the SAL may include entries for one or more of the SIDs assigned in the North American cellular system). If more than one preferred or target system exists for a given region, then the preferred systems in an SAL entry may be listed in order of preference and/or the air interface technology may be provided for each preferred system so that the mobile station may select the most appropriate system for that region. An example of the information fields or elements for the SAL and SAL entries is provided and discussed below with reference to Tables 10 and 11.

If, for example, the SAL is stored in the memory 67 of the mobile station 68, then memory 67 should be provided with sufficient storage capacity in order to store all of the necessary operational information, including the SIDs and corresponding frequency bands of all the preferred or target systems that exist. As a result, the memory 67 provided in the mobile station 68 of the present invention may have to be implemented with a memory capacity that is larger than that of, for example, conventional mobile stations. However, the capacity of the memory may be limited by restricting the SAL to contain entries only for SIDs on the home and secondary bands. By comparing the broadcasted SID of the current system with the SIDs of the entries in the SAL, the mobile station can determine, at step S.12, whether the current system is a preferred system (i.e., whether the current system corresponds to a preferred service provider that has a service agreement or billing arrangement with the user's home network service provider).

If the current system corresponds to a preferred system for the area in which the mobile station is located, then at step S.14 the mobile station will stay on that band and obtain service from the preferred system. If, however, the current system is not the preferred system for the given area, the SAL will indicate the band or bands where the mobile station will find a preferred system, and the mobile station will obtain service from the indicated band(s) at step S.16. Thus, the mobile station may obtain service by switching to the indicated band of the preferred system without having to randomly scan bands until a preferred system is located.

Additional features may be incorporated into the embodiment of FIG. 3. For example, if a control channel cannot be located on the home band at step S.4, an indication may be displayed to the mobile station user to indicate that "No Service" is available. In addition, in accordance with another aspect of the invention, when no control channels are found on the home band at step S.4, a defined secondary band may be scanned by the mobile station to locate a control channel. The secondary band may be defined and set up as a band in which the mobile station is guaranteed of finding a control channel (e.g., either the A band or B band at 800 MHz). The frequencies of the secondary band that should be scanned by the mobile station may be stored in the memory of the mobile station. If a control channel is found on the secondary band, then logic could proceed directly from step S.4 to step S.10 to determine if the current system is a preferred system. Thereafter, service may be obtained in accordance with steps S.12–S.16 in FIG. 3.

According to an aspect of the present invention, the SAL that is stored in the mobile station may include various information for each SID entry that is stored. This information may include the set of frequencies where a preferred system may be found when the mobile station is roaming, as well as the air interface technology that is supported on each of the preferred bands to assist the mobile station in finding a system of a given technology type. The SAL may also provide information that directs the mobile station to search particular channels (e.g., RF channels) in the preferred band for a control channel. As a result, the mobile station of the present invention may quickly obtain service on a preferred system in any area where there is cellular or PCS coverage. Further, the present invention reduces scanning and acquisition time by utilizing the SAL which directs the mobile station to the exact band(s) where the preferred system may be found when outside of the home network area. The present invention also provides an advantage over prior systems in that it is mobile station-based, and can be integrated into conventional network architectures without requiring any modification to current network or air-interface standards.

FIGS. 4–7 illustrate exemplary logic flow of an intelligent roaming process according to one implementation of the present invention. The various processes and operations illustrated in the logic flow diagrams of FIGS. 4–7 may be implemented by, for example, programming the microprocessor-based control system 61 of the mobile station 68. The programming of control system 61 may be carried out by any suitable combination or use of software, hardware and/or firmware. Once again, it is noted that while the following description makes particular reference to a cellular network environment, the aspects of the present invention may also be applied to, for example, PCS or PCN network systems. In addition, the embodiment described below is based on a mobile station which has been programmed with SAL information for carrying out the intelligent roaming features of the present invention.

Figure 4:
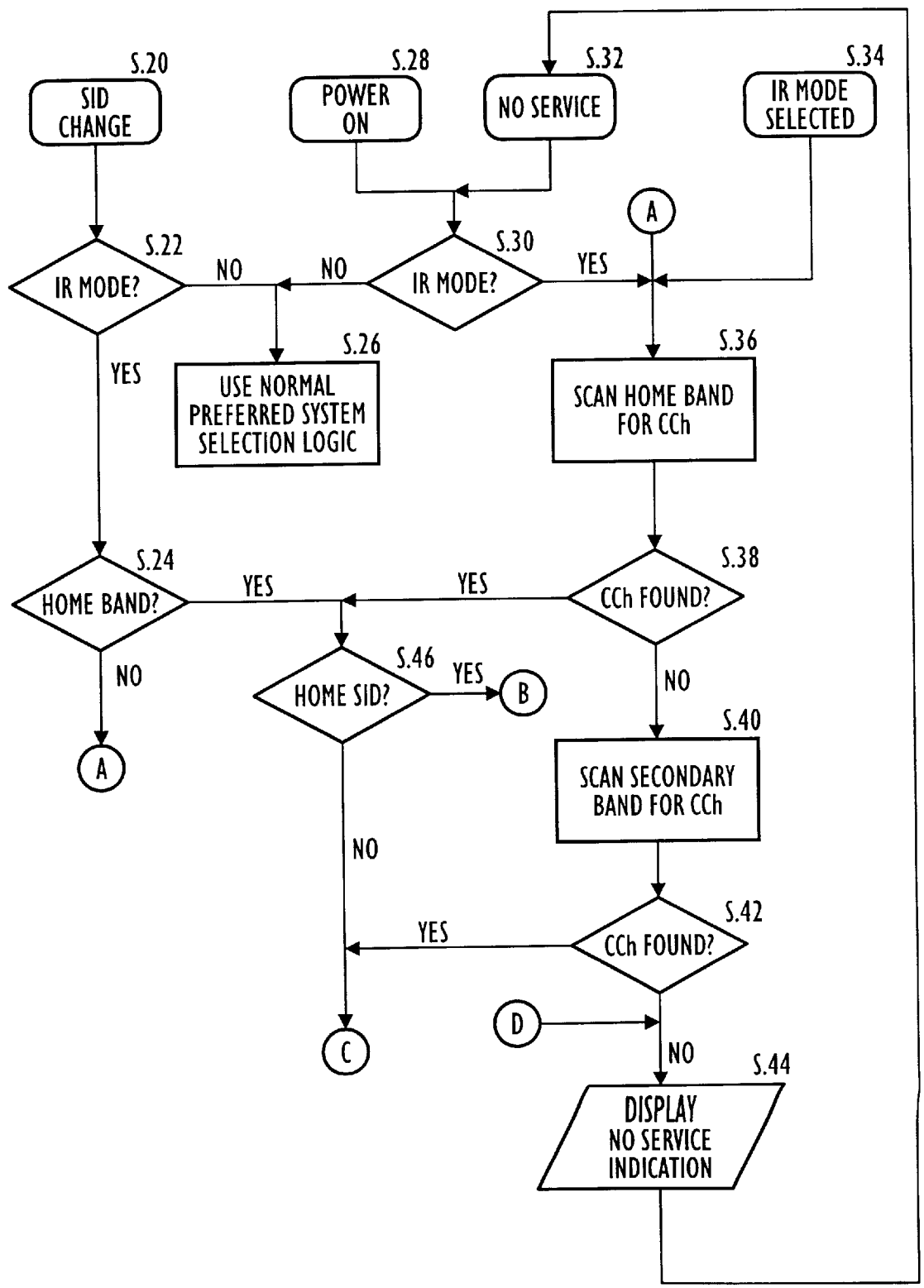
FIGS. 4, 5, 6 and 7 are flow diagrams of the processes and operations of an intelligent roaming process, in accordance with one implementation of the present invention.

As shown in FIG. 4, when the mobile station is in a Power On state or a No Service condition at steps S.28 and S.32, respectively, it is determined at step S.30 whether the mobile station is set in an Intelligent Roaming mode (IR Mode). In accordance with the present invention, the mobile station user may be given the option to select a conventional roaming mode (e.g., A Band Only, B Band Only, A Band Preferred, etc.) to operate according to Preferred System Selection logic, or to select an IR Mode in which the SAL and intelligent roaming capabilities of the present invention are executed. If it is determined that the IR Mode has not been selected (e.g., by checking the status of a stored, IR Mode status flag), then at step S.26 conventional roaming or roaming according to Preferred System Selection logic may be performed. If, however, it is determined that the mobile station is in an IR Mode at step S.30, then logic proceeds to step S.36. Logic flow will also proceed from step S.34 to step S.36, whenever the IR Mode is selected by the user.

Figure 5:
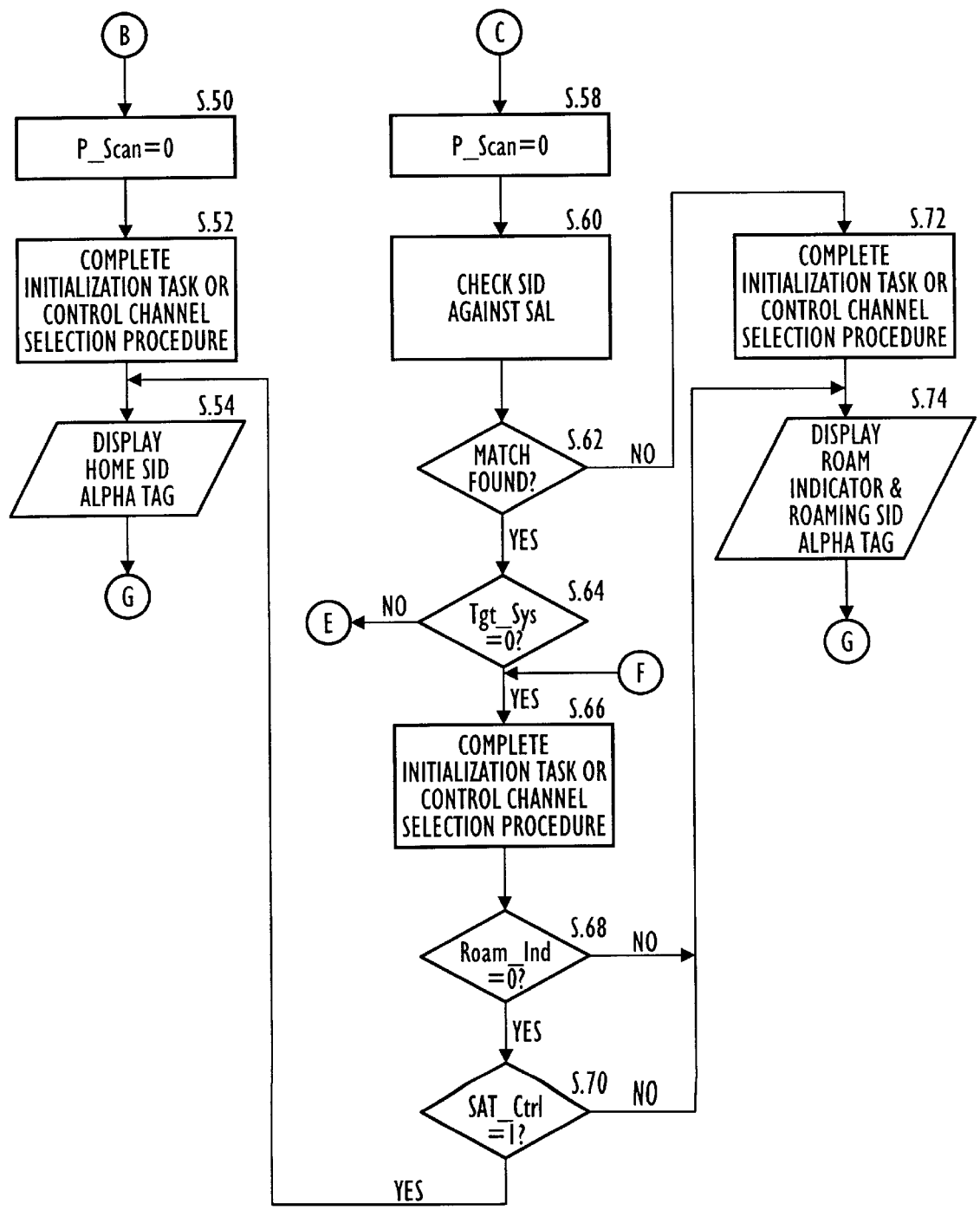

At step S.36, the mobile station scans the frequency band of the home system to locate a control channel (CCh). The control channel may either be an analog control channel (ACC) or a digital control channel (DCCH), and the home frequency band that should be scanned may be stored in memory of the mobile station. At step S.38, it is determined whether a control channel has been located. If the mobile station determines that a control channel has been found at step S.38, then at step S.46 it is determined whether the mobile station is located in its home system. Step S.46 may be determined by comparing the SID or equivalent system identification number of the current system that was received over the control channel with the home SID of the mobile station's home service provider. If the current SID corresponds to the home SID, then it is determined at step S.46 that the mobile station is located in its home system and logic proceeds to step S.50, which is illustrated in FIG. 5 and described in greater detail below. If the current SID does not correspond to the home SID, then it is determined at step S.46 that the mobile station is not located in its home system and logic proceeds to step S.58 (see FIG. 5).

If it is determined at step S.38 that a control channel cannot be located on the home band, then logic proceeds to step S.40 where a secondary band may be scanned by the mobile station so that a control channel may be located. In accordance with an aspect of the present invention, a defined secondary band may be scanned by the mobile station when no control channels are found on the home band. The secondary band should be defined and set up as a band in which the mobile station is guaranteed of finding a control channel (e.g., either the A band or B band at 800 MHz). The frequencies of the secondary band that should be scanned by the mobile station may be stored in the memory of the mobile station. If a control channel is found on the secondary band at step S.42, then logic proceeds to step S.58 in FIG. 5. Otherwise, if a control channel can not be located, logic proceeds to step S.44 so that a "No Service" indication (e.g., a "No Service" icon, message or status light) is displayed to the user of the mobile station to indicate that no service is available. The No Service indication may be displayed, for example, on the display 65 of the mobile station 68. After step S.44, the mobile station enters a No Service state or condition, and logic proceeds back to step S.32 in FIG. 4. Before proceeding back to step S.32, it may be preferable to have the mobile station pause for a predetermined time period in order to conserve battery life in a No Service area.

If the mobile station is changing from one system to another so as to cause the current SID to change at step S.20, then logic proceeds to step S.22 where it is determined by the mobile station whether the IR Mode has been selected. The IR Mode may be a mode of operation which, for example, the mobile station user can select from a system selection menu displayed at the mobile station (e.g., at display 65 of the mobile station 68). Alternatively, the mobile station may be configured to automatically go into the IR Mode. For example, the IR Mode may be programmed into the NAM by the home service provider or coded in the mobile station's operating software by the mobile station manufacturer. If it is determined that the IR Mode has not been selected, then at step S.26 conventional roaming or roaming according to Preferred System Selection logic may be performed. As illustrated in FIG. 4, step S.26 will also be executed when it is determined at step S.30 that the IR Mode has not been selected.

If it is determined that the intelligent roaming mode (IR Mode) has been selected at step S.22, then logic proceeds to step S.24 where it is determined whether the mobile station is operating on its home frequency band (although not necessarily within its home system). If the mobile station is not operating on its home band, then logic proceeds to step S.36, as illustrated in FIG. 4. Otherwise, if it is determined at step S.24 that the mobile station is operating on its home band, then logic proceeds to step S.46 to determine if the mobile station is located in its home network. If the current SID corresponds to the home SID, then it is determined at step S.46 that the mobile station is located in its home system and logic proceeds to step S.50. If the current SID does not correspond to the home SID, then it is determined at step S.46 that the mobile station is not located in its home system and logic proceeds to step S.58.

When it is determined at step S.46 that the mobile station is located in its home system, logic proceeds to step S.50 in FIG. 5. At step S.50, a periodic scan flag (P Scan) is initialized and set to zero. The P_Scan flag may be stored in the mobile station and may be provided to indicate when the mobile station should periodically scan for preferred or target systems after obtaining service on the current system.

If, for example, the P_Scan flag is set to one, then this flag will indicate to the mobile station that it should periodically scan for target systems after obtaining service on the current system. If, however, the P_Scan flag is set to zero, then periodic scanning is not necessary. At step S.50, the P_Scan flag is set to zero, since the mobile station is in its home system and scanning is not required.

Figure 7:
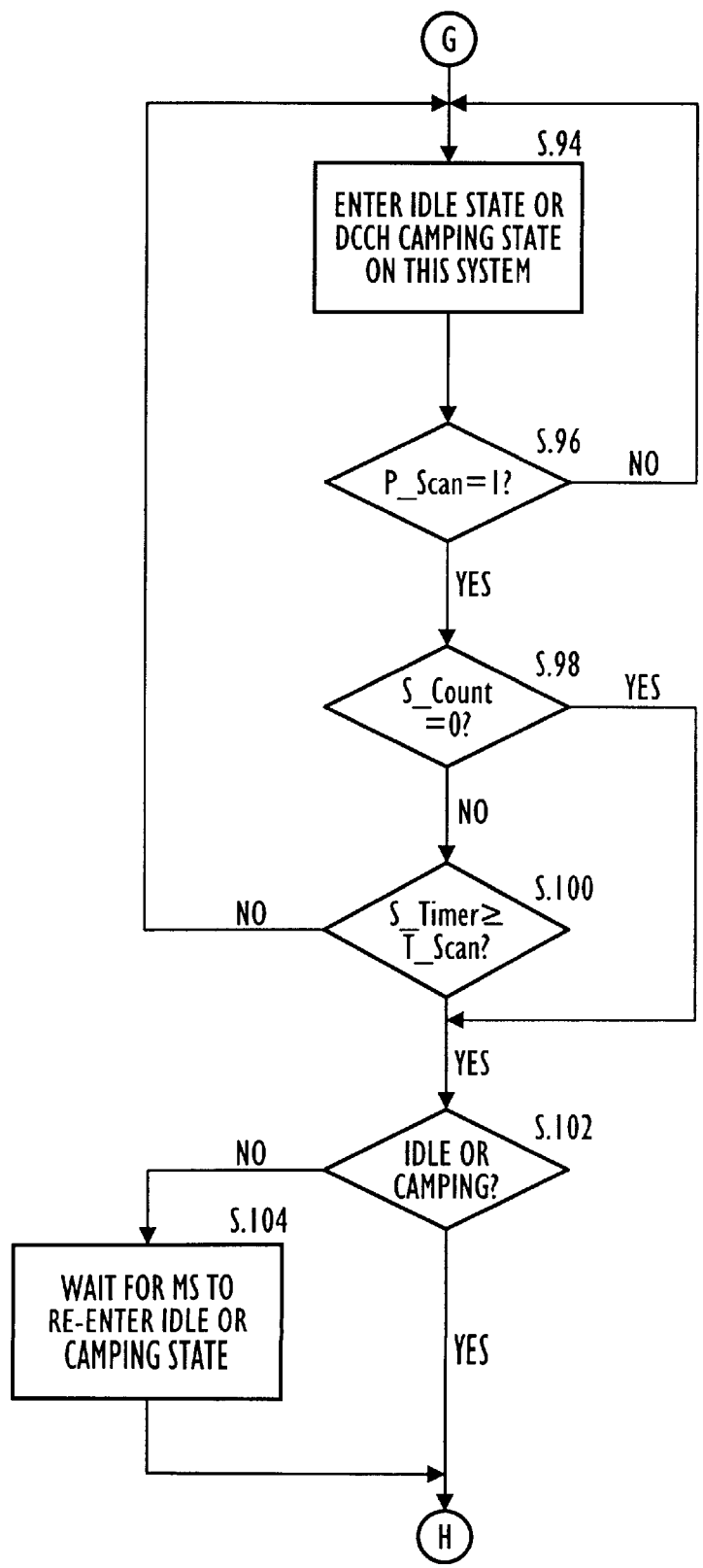

After step S.50, the mobile station completes an Initialization Task or a Control Channel Selection procedure at step S.52 in order to obtain service on the home network system. The Initialization Task and Control Channel Selection procedures may be defined and performed in accordance with Interim Standard 136 (IS-136). The Initialization Task procedure should be performed when an analog control channel (ACC) is being used, whereas the Control Channel Selection procedure should be performed when a digital control channel (DCCH) is being used to obtain service. Following step S.52, a Home SID Alpha Tag (e.g., an alphanumeric tag such as "Home" and/or the name of the home network system) or other type of indication (e.g., a Home SID icon or status light) may be displayed at step S.54 to indicate to the mobile station user that it is operating on its home system. The Home SID Alpha Tag may be displayed, for example, on the display 65 of the mobile station 68. Thereafter, logic proceeds to step S.94, which is illustrated in FIG. 7 and described in greater detail below.

When it is determined at step S.46 that the mobile station is not located in its home system, logic proceeds to step S.58 in FIG. 5. As shown in FIG. 5, the periodic scan (P_Scan) flag is initialized and set to zero at step S.58. The P_Scan flag is set to zero at step S.58 since the mobile station has located a control channel (although not for the home SID) and it is unknown whether the current system is a preferred system. Once again, the P_Scan flag may be provided to indicate when the mobile station should periodically scan for preferred or target systems after obtaining service on the current system. If, for example, the P_Scan flag is set to one, then the mobile station should periodically scan for target systems after obtaining service on the current system. If, however, the P_Scan flag is set to zero, then periodic scanning is not necessary. Target or preferred systems may relate to systems that the mobile station should prefer service on based on service or billing agreements between the home service provider and other service providers. Target systems may also be defined based on a particular air interface technology. Following step S.58, logic proceeds to step S.60 to determine whether a target or preferred system exists for the current system in which the mobile station is located.

At step S.60, the mobile station compares or checks the SID of the current system against the information contained in the SAL stored in the mobile station. The SAL stored in the mobile station may comprise a table of entries including the SID and corresponding frequency band(s) of each target or preferred system. At step S.62, it is determined whether a match is found between the SID of the current system and one of the SIDs of the entries in the SAL. If a match is found, then logic proceeds to step S.64. If, however, a match is not found, then logic proceeds to step S.72. At step S.72, the Initialization Task or Control Channel Selection procedure is completed by the mobile station, and then a Roam Indicator (e.g., a roam icon or a dedicated status light) and/or a Roaming SID Alpha Tag (e.g., a alphanumeric tag such as "Roaming" and/or the name of the current network system) are displayed to the mobile station user to indicate a roaming condition at step S.74. After step S.74, logic proceeds to step S.94, which is described below with reference to FIG. 7.

As shown at step S.64 in FIG. 5, when there is a match between the SID of the current system and one of the entries in the SAL, it is determined whether the number of target systems (Tgt_Sys) for the current SID is equal to zero. In accordance with an aspect of the present invention, each entry of the SAL may include a Number of Target Systems or Tgt_Sys field (see, e.g., Table 11) to indicate the number of target systems that are present for the corresponding SID. The Tgt_Sys field may be four bits in length, and may be analyzed by the mobile station when there is a match between the SID of the current system and the SID of one of the entries of the SAL. By checking the Tgt_Sys field of the matched entry in the SAL, the mobile station can determine the number of target or preferred systems that exist for the current system.

If there are no target or preferred systems for the given SID, then logic proceeds to step S.66, where an Initialization Task or Control Channel Selection procedure is completed by the mobile station. Thereafter, at step S.68, it is determined whether a roam indicator (Roam_Ind) bit is equal to zero. In accordance with the present invention, a Roam_Ind bit may be provided to indicate when a roam indication (e.g., a Roam Indicator or a Roaming SID Alpha Tag) should be displayed by the mobile station to indicate to the user that the mobile station is roaming. The Roam_Ind bit may be stored in the mobile station. For example, the Roam_Ind bit may be stored and provided as a bit field within each of the SAL entries for the current system (see, e.g., Table 11) and/or the preferred or target system (see, e.g., Table 14). When, for example, the Roam_Ind bit is equal to one, the mobile station will display the roam indication to the user. If, however, the Roam_Ind bit is equal to zero, then the roam indication will not be displayed. The mobile station may analyze the Roam_Ind bit for the system that it will receive service on (i.e., the current system or a target system) in order to determine whether to display a roam indication.

If it is determined at step S.68 that the Roam_Ind bit is set to zero, then the roaming indication should not be displayed and logic flow proceeds to step S.70. If, however, the Roam_Ind bit is not equal to zero (i.e., the bit is set to one), then logic flow will proceed to step S.74, as illustrated in FIG. 5. As discussed above, when the Roam_Ind bit is set to one, the mobile station will be instructed to display the roaming indication. At step S.74, the Roam Indicator (e.g., a roam icon or a dedicated status light) and/or a Roaming SID Alpha Tag (e.g., a alphanumeric tag such as "Roaming" and/or the name of the current network system) are displayed to the mobile station user to indicate a roaming condition. Thereafter, logic flow will proceed to step S.94, which is discussed below with reference to FIG. 7.

If the Roam_Ind bit is set to zero, then at step S.70 it is determined whether a SID Alpha Tag Control (SAT_Ctrl) bit is set to one. The SAT_Ctrl bit may be provided to indicate when a Home SID Alpha Tag (e.g., an alphanumeric tag such as "Home" and/or the name of the home network system) should be displayed by the mobile station to indicate to the user that the mobile station is operating on its home system or operating in a system affiliated or owned by its home service provider. The SAT_Ctrl bit may be stored in the memory of the mobile station and be provided as a bit field within a table containing other operational information (see, e.g., Table 5). When, for example, the SAT_Ctrl bit is set to one, the mobile station will display the Home SID Alpha Tag to the user. If, however, the SAT_Ctrl bit is set to zero, then the Home SID Alpha Tag will not be displayed.

If it is determined at step S.70 that the SAT_Ctrl bit is set to one, then at step S.54 the mobile station will display the Home SID Alpha Tag to the user. After step S.54, logic flow will proceed to step S.94 (see, e.g., FIG. 7). If, however, it is determined that the SAT_Ctrl bit is not set to one (i.e., the SAT_Ctrl bit is set to zero), then logic proceeds to step S.74, so that the Roam Indicator and/or the Roam SID Alpha Tag are displayed.

Figure 6:
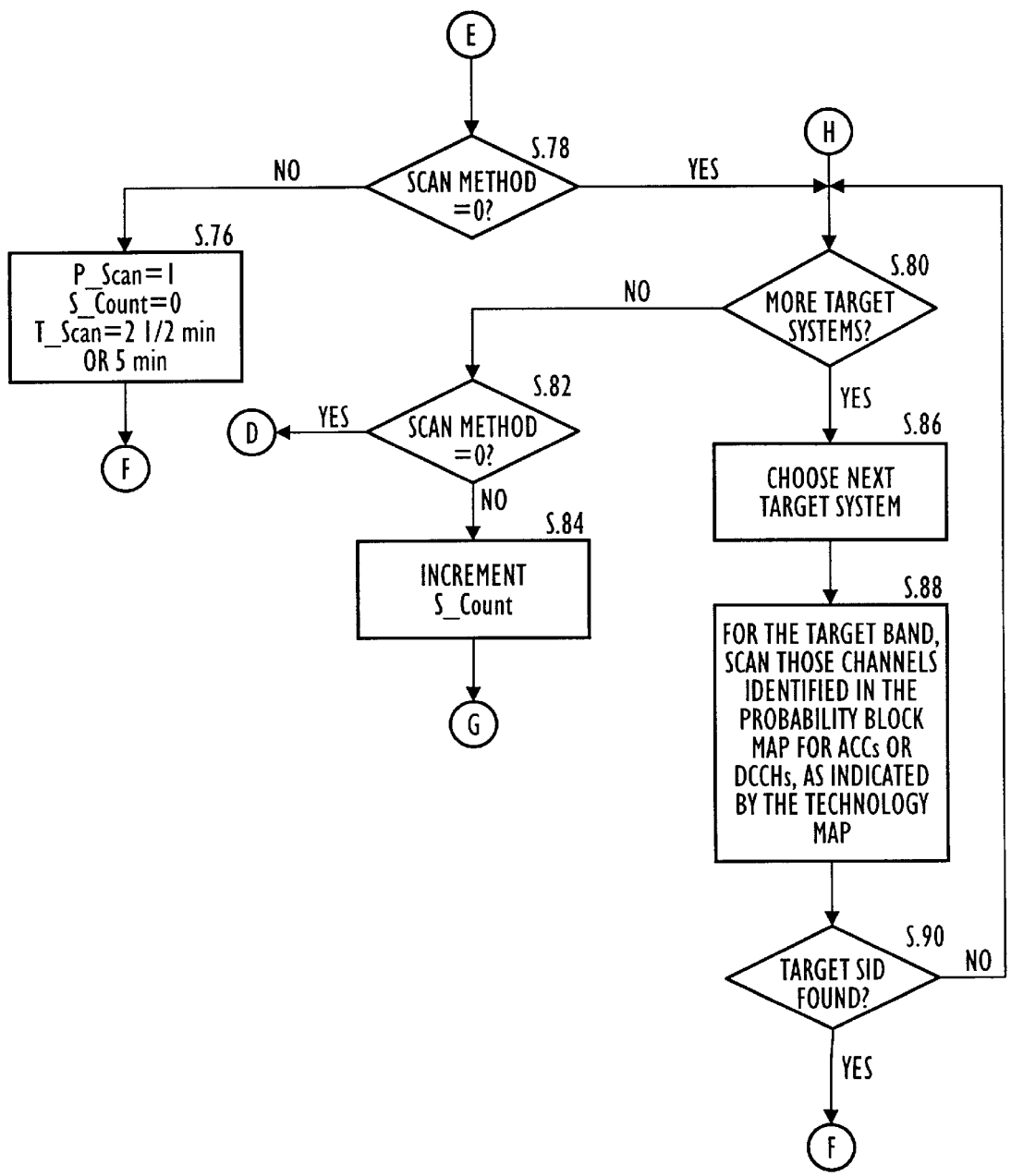

Logic proceeds from step S.64 in FIG. 5 to step S.78 in FIG. 6 when it is determined that one or more target systems exist for the current system. As shown in FIG. 6, the mobile station at step S.78 checks a Scan Method bit field to determine whether the mobile station should scan for a target system indicated by the SAL until a target system is found, or obtain service on the current system before scanning for target systems periodically. The Scan Method bit field may be one or two bits in length, and may be provided as a bit field within each SAL entry (see, e.g., Table 11). If, for example, the Scan Method bit field is equal to zero, then the mobile station may continuously scan until a target system is found. If, however, the Scan Method bit field is equal to one, then the mobile station will obtain service on the current system before scanning for target systems indicated by the SAL. Accordingly, if the Scan Method bit field is determined to be set to zero at step S.78, then logic flow proceeds to step S.80. If, however, the Scan Method bit field is determined not to be equal to zero (i.e., the Scan Method bit field is set to one), then logic flow proceeds to step S.76.

At step S.76, the mobile station may initialize various flags and counters before obtaining service on the current system. These operational parameters may be stored within the memory of the mobile station. Thus, at step S.76, the periodic scan (P_Scan) flag may, for example, be set to one, in order to indicate that the mobile station should periodically scan for target systems after obtaining service on the current system. In addition, a scan count (S_Count) counter, which is a counter to indicate how many times the mobile station has scanned for a target system after obtaining service on the current system, may be initialized and set to zero at step S.76. Moreover, a scan time constant or value (T_Scan) between periodical scans by the mobile station may be set to a predetermined time interval. By way of non-limiting examples, the T_Scan value may be set to two and one-half minutes or five minutes. After initializing and setting the various operational parameters at step S.76, logic flow proceeds to step S.66, which is described above with reference to FIG. 5.

If the Scan Method bit field is determined at step S.78 to be equal to zero, then at step S.80 it is determined whether one or more target systems exist for the current SID. The mobile station may determine if there are more target systems by analyzing the target system information provided in the SAL entry corresponding to the current SID. Each SID entry in the SAL may have a list of one or more target systems, that are each analyzed and processed by the mobile station in turn, starting with the first identified system. The SAL entry corresponding to the current SID may contain information indicating the number of target systems that exist (see, e.g., Table 11). If service can not be obtained on a target system identified by the SAL, the mobile station will proceed to the next target system if more target systems exist in the SAL entry. The mobile station may sequentially check each of the target systems in the SAL entry until a suitable target system is located. When analyzing the first target system in the SAL entry at step S.80, logic flow will proceed from step S.80 to step S.86. Additionally, for subsequent checks of target systems identified in the SAL, when it is determined that more target systems exist at step S.80, then logic will also proceed from step S.80 to step S.86.

If it is determined at step S.80 that there are no more target systems, then at step S.82, it is determined whether the Scan Method bit field is equal to zero. If it is determined at step S.82 that the Scan Method bit field is equal to zero, then logic proceeds to step S.44 (see FIG. 4), so that a "No Service" indication may be displayed to the mobile station user. If it is determined at step S.82 that the Scan Method bit field does not equal zero, then logic proceeds to step S.84 to increment the scan count (S_Count) counter by one. As noted above, a S_Count counter may be provided to indicate how many times the mobile station has scanned for a target system after obtaining service on the current system. Following step S.84, logic proceeds to step S.94, which is described in greater detail below with reference to FIG. 7.

If it is determined that more target systems exist at step S.80, then logic proceeds to step S.86. At step S.86, the first or next target system is selected from the SAL entry for the current SID. By analyzing the SAL, the mobile station can determine the target band associated with the preferred system, and scan those channels identified in a Probability Block Map to locate a control channel, as shown in step S.88. The Probability Block Map may comprise a bit map indicating the most likely channel block or blocks in which the mobile station may find a control channel (see, e.g., Table 9). The Probability Block Map may be stored in the memory of the mobile station and be provided as a bit field within a table containing other operational information (see, e.g., Table 5). In addition, a Technology Map in the form of a bit map may be provided to indicate to the mobile station the air-interface technology available in a given band and to indicate whether the control channel is an analog control channel (ACC) or a digital control channel (DCCH). The Technology Map may be provided as part of the target system information for each SAL entry (see, e.g., Tables 11, 14 and 15).

With the Technology Map, a mobile station may determine the air-interface technology or other technology that is available with a given target system. If the target system does not support the mobile station (e.g., by having air-interface technology that is incompatible), then the target system may be skipped. That is, if the mobile station has particular air-interface technology or other technology requirements, and it is determined at step at step S.88 that the target system identified in the SAL does not support such technology requirements based on the Technology Map, the mobile station may skip that target system (e.g., without scanning for that target system) and proceed directly from step S.88 back to step S.80. Thereafter, other target systems in the SAL (if present) may be analyzed in order to obtain service.

Following step S.88, the mobile station determines whether a target SID has been located based on the identified channels that were scanned. If a target SID is located, then logic proceeds to step S.66 (see FIG. 5), so that the mobile station can obtain service from the located target system. Otherwise, if a target system is not located on the channels that were scanned, then logic proceeds back to step S.80 to determine if more target systems are identified in the SAL for the current SID and, if so, to perform subsequent scanning to locate a preferred system.

FIG. 7 illustrates the various processes and operations that are performed at steps S.94–S.104 of an embodiment of the intelligent roaming process of the present invention. At step S.94, the mobile station enters into an Idle state or a Camping state for the current or located system. The mobile station may enter into an Idle state when an analog control channel (ACC) has been located. If, however, a digital control channel (DCCH) is located, then the mobile station may enter into a Camping state. During the Idle or Camping state, the mobile station is waiting for information to be sent via the control channel. For example, with a DCCH, the mobile station may enter a Camping state when it is on a control channel and waiting to receive a page.

At step S.96, the periodic scan (P_Scan) flag may be analyzed to determine whether the mobile station should periodically scan for target systems after obtaining service on the current system. If the P_Scan flag is set to one (i.e., indicating that the mobile station should periodically scan for target systems), then logic proceeds to step S.98. If, however, it is determined that the P_Scan flag is not set to one at step S.96, then logic returns to step S.94 in FIG. 7. Logic will proceed from step S.96 to step S.94 whenever the mobile station locates a target system and the P_Scan flag is set to zero, since it is not necessary for the mobile phone to scan for other systems.

At step S.98, the mobile station determines whether the scan count (S Count) counter is equal to zero. As described above, a S_Count counter may be provided to indicate how many times the mobile station has scanned for a target system after obtaining service on the current system. If it is determined that the S_Count counter is equal to zero, then logic proceeds to step S.102. On the other hand, if it is determined that the S_Count counter does not equal zero, then logic proceeds to step S.100, where it is determined if the scan time (T_Scan) has elapsed since the last scan. In accordance with an aspect of the present invention, a clock-based, scan timer (S_Timer) may be provided to monitor and keep track of the elapsed time between scans by the mobile station. The value of the S_Timer may be compared with the selected T_Scan value (e.g., two and one-half minutes or five minutes) to determine if the interval between periodic scans for a target system has elapsed. If the value of the S_Timer is less than the T_Scan value, then logic proceeds from step S.100 back to step S.94. Otherwise, if it is determined that the interval between periodic scans has elapsed (i.e., that S_Timer is greater than or equal to T_Scan), then logic proceeds to step S.102.

At step S.102, it is determined whether the mobile station is presently in an Idle or Camping state. Whether the mobile station is an Idle or Camping state will depend on whether a ACC or DCCH has been located, and the present state of the mobile station. If the mobile station is in an Idle or Camping state, then logic proceeds to step S.80, which is described above with reference to FIG. 6. Otherwise, if it is determined that the mobile station is not in an Idle or Camping state, logic proceeds to step S.104, where processing is delayed until the mobile station re-enters an Idle or Camping state. Thereafter, logic proceeds to step S.80 to determine if more target systems are available.

According to the present invention, the SAL and other operational information may be downloaded to the mobile station or phone unit by an interface that physically connects to the mobile station or by an interface that utilizes over-the-air programming and downloading. When a mobile station is registered to a user with a home cellular or PCS provider, the SAL may be physically downloaded via an interface (e.g., a computer-based interface) that connects to the mobile station. Alternatively, the SAL may be programmed and stored in the mobile station when the mobile station is manufactured. Subsequent updates and modification to the SAL may be performed by requiring the user to bring the mobile station into a service center, so that the new information may be downloaded to update the SAL based on changes in preferred system information.

In order to provide increased flexibility, however, such programming and downloading of SAL information may be performed over-the-air. In accordance with an aspect of the present invention, over-the-air programming of the SAL allows the SAL to be initially downloaded and/or updated to the mobile station without requiring the user to bring the mobile station into a service center. The over-the-air programming capability of the present invention provides several advantages, including improving the ease by which the mobile station can be programmed with new preferred system information as it becomes available to the home cellular or PCS operator.

Figure 8:
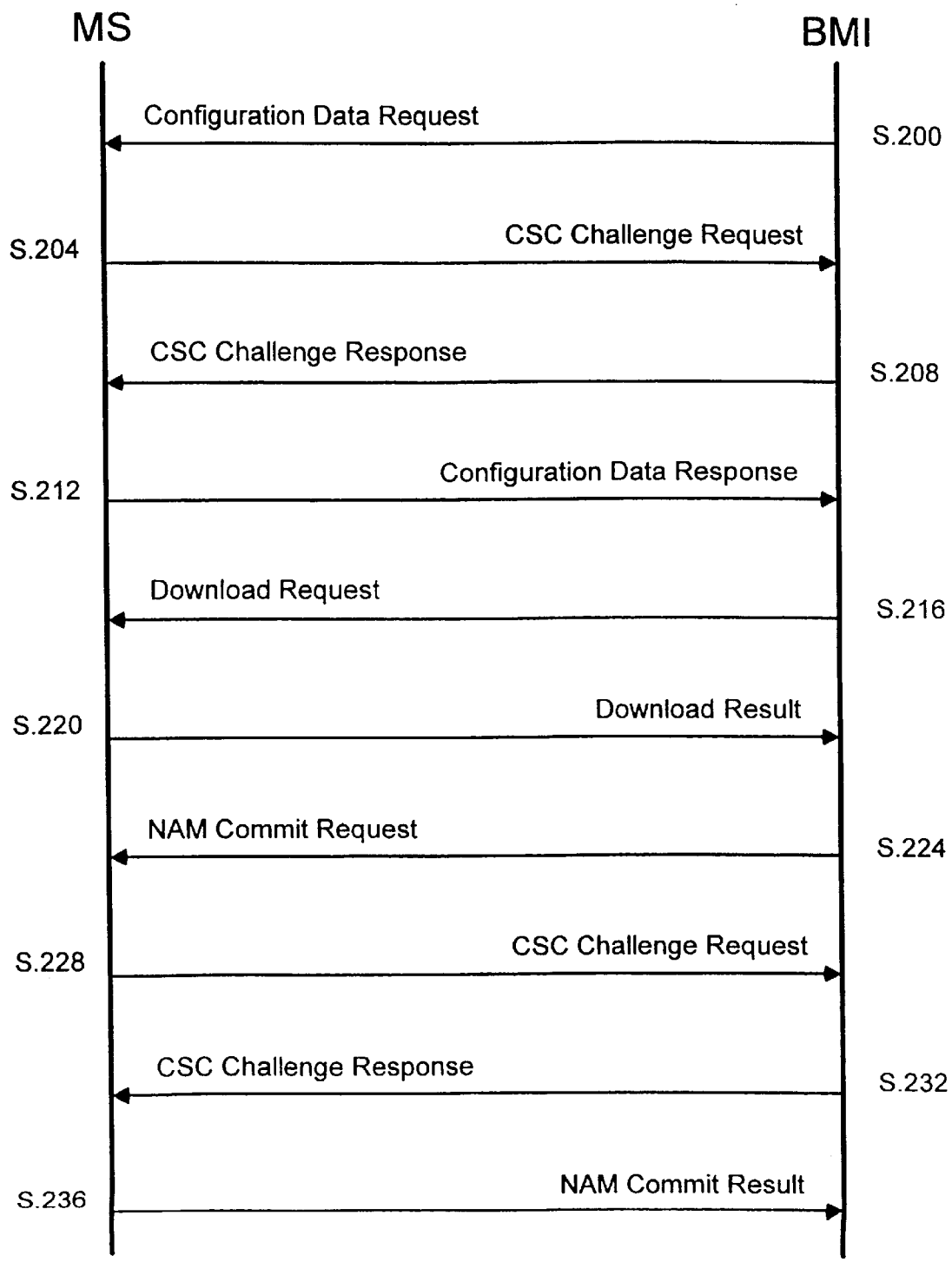
FIG. 8 illustrates an exemplary message flow for performing over-the-air programming of a mobile station, according to an embodiment of the present invention.
Figure 9:
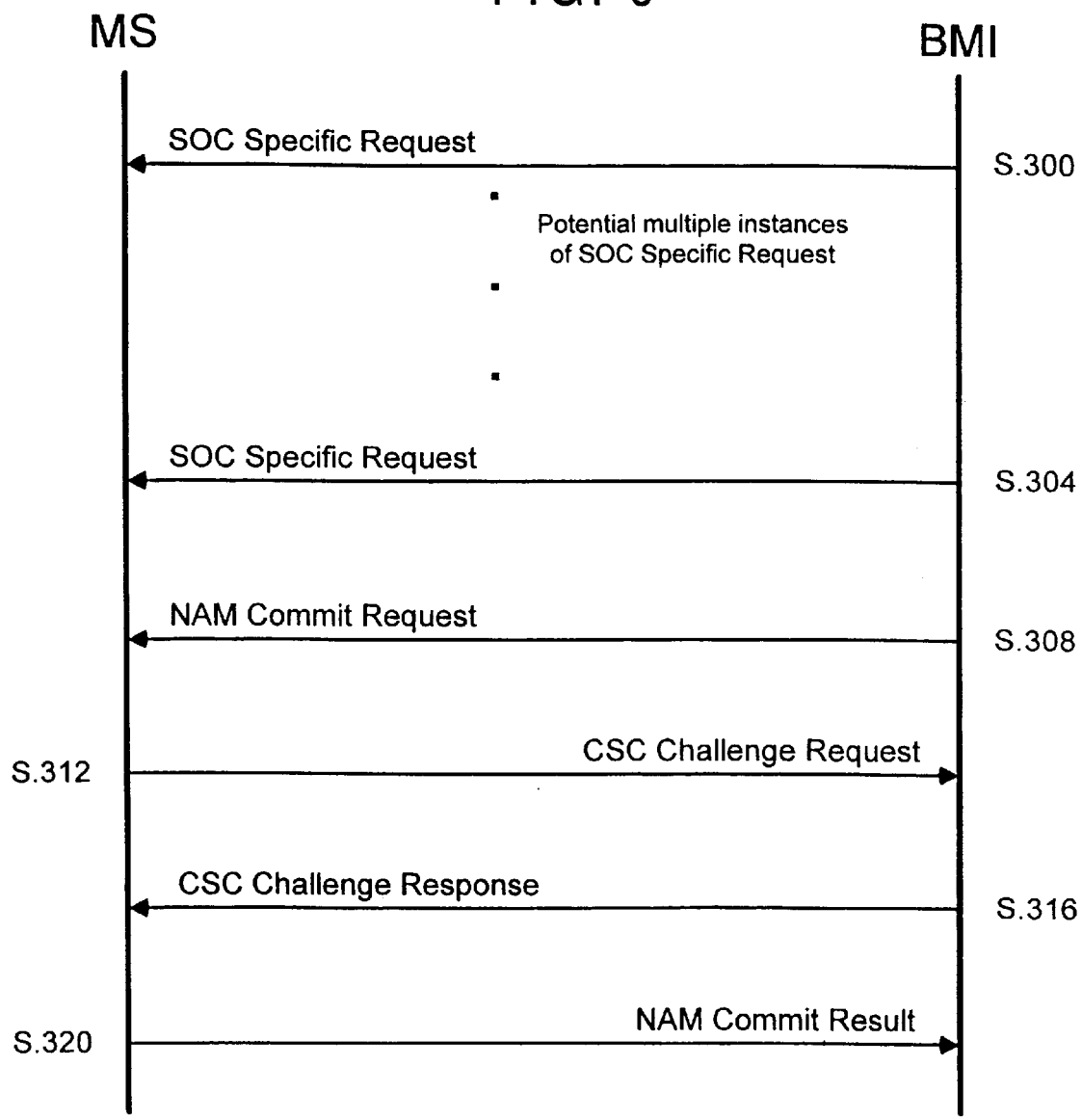
FIG. 9 illustrates, in accordance with another embodiment of the present invention, an exemplary message flow for performing over-the-air programming of a mobile station.

Referring to FIGS. 8 and 9, embodiments of the present invention for providing over-the-air programming of the SAL to the mobile station will be described. In accordance with the invention, over-the-air programming of the SAL may be accomplished as part of the Over-the-Air Activation Teleservice (OATS) defined in the Addendum to Interim Standard 136A (IS-136A) of the North American Cellular System, or as a different teleservice. A teleservice is generally an end-toend data application between a mobile station and a network entity (e.g., a Message Center or Over-the-Air Activation Function (OTAF)) that is typically independent of and transparent to a Base Station/Mobile Switching Center/Interworking Function (BMI). The BMI provides the teleservice transport, but is not directly involved in processing the actual teleservice data. For additional information concerning OATS, OTAF and BMI, see the Addendum to IS-136 Revision A contained in TIA/EIA/IS-136.1-A-1, *Addendum No. 1 to TIA/EIA/IS-136.1-A*, Telecommunications Industry Association, November 1996, the disclosure of which is expressly incorporated herein by reference in its entirety.

According to one embodiment of the present invention, the over-the-air programming of the SAL may be made part of OATS, by standardizing and providing new information elements to program the mobile station with the SAL and intelligent roaming data (see, for example, FIG. 8 and the accompanying description provided below). Alternatively, in accordance with another embodiment of the present invention, the over-the-air programming of the SAL may be made part of the OATS by embedding the new information as messages within the System Operator Code (SOC) Specific Request message defined for OATS. The System Operator Code (SOC) is a twelve bit value that is broadcasted on the control channel (normally a DCCH) and used to identify which operator is providing service. In the two embodiments described below, if an SAL entry is a duplicate of another SAL entry already stored in the mobile station, then a new SAL entry may overwrite the old SAL entry in memory. In addition, if there is a large quantity of SAL information that needs to be stored in the mobile station, the initial downloading of all of the SAL information may be performed by a physical interface or connection (e.g., during manufacture of the mobile station), and subsequent updates or reprogramming of specific data in the SAL may be performed over-the-air.

FIG. 8 illustrates, in accordance with an embodiment of the present invention, an exemplary diagram of message flows between a Mobile Station (MS) and the Base Station/Mobile Switching Center/Interworking Function (BMI) for implementing over-the-air programming of the SAL based on OATS. The MS comprises a station used by a cellular or PCS subscriber to access network services over an air interface. The MS may be implemented as a portable phone unit, a unit installed in a vehicle or a fixed subscriber station. Base stations provide the ability for each MS to access network services over an air interface. An MSC or MTSO is connected to at least one base station, and may use interworking functions to connect to other networks.

According to an aspect of the present invention, the BMI includes the network entity that stores a centralized or master SAL database, and that oversees the programming of the SAL in each of the mobile stations. The same network entity that provides OATS may also provide the over-the-air programming of the SAL for the mobile stations. OATS may be used on either a Digital Traffic Channel (DTC) or a Digital Control Channel (DCCH). If there is a large quantity of SAL information to be programmed, multiple Download Request messages may be sent to the mobile station in order to program all of the intelligent roaming data. In FIG. 8, CSC is an acronym for the Customer Service Center, and NAM is an acronym for Number Assignment Module in the mobile station.

According to the embodiment of FIG. 8, the existing OATS messages are used for over-the-air programming of the SAL in the mobile station. However, new information elements and fields are defined, according to the present invention, for some of the OATS messages in order to program the mobile station with the SAL information. The particular OATS messages that are modified to incorporate the SAL information include, for example, the Confirmation Data Request, the Configuration Data Response, the Download Request, and the Download Result messages, which are indicated in FIG. 8 and discussed in detail below.

When a Configuration Data Request message is sent from the BMI to the MS at step S.200, specific configuration data blocks are solicited from the mobile station. An example of the contents of a modified Configuration Data Request message, according to an aspect of the invention, is indicated below in Table 1. In Table 1, and in the subsequent tables discussed below, the "Type" may be either Mandatory (M) or Optional (O), and the "Length" is given in bits. Further, for Table 1 and the subsequent tables provided herein, the new information elements and modifications to the OATS-based messages are underlined in the tables.

TABLE 1

Configuration Data Request

| Information Element | Type | Length |
|---|---|---|
| Message Type | M | 6 |
| Remaining Length (in Octets) | M | 8 |
| ConfigurationDataBlockMap | M | 16 |

As shown in Table 1, the Configuration Data Request may be modified to include a new entry in the Configuration Data Block Map. The Configuration Data Block Map is an information element or data message that provides a list of the Configuration Data Blocks for which the BMI requests configuration information from the MS. As shown below in exemplary embodiment of Table 2, the Configuration Data Block Map may include specific values for a NAM Configuration Data Block request and a Non-Public System Configuration Data Block request. In addition, according to the present invention, values may be provided for a Band Info request and System Access List request for the purpose of programming the mobile station. A more detailed discussion of the Band Info and System Access List data blocks of the present invention is provided below. In Table 2, and the subsequent tables, the value "X" (where present) represents that the value may be assigned either a value of zero or value of one.

TABLE 2

Configuration Data Block Map

| Value | | | | Function |
|---|---|---|---|---|
| XXXX | XXXX | XXXX | XXX1 | NAM configuration Data Block requested |
| XXXX | XXXX | XXXX | XX1X | Non-Public System Configuration Data Block requested |
| XXXX | XXXX | XXXX | X1XX | Band Info requested |
| XXXX | XXXX | XXXX | 1XXX | System Access List requested |
| All other values may be reserved | | | | |

At step S.204, a CSC Challenge Request is sent from the MS to the BMI in response to receiving the Configuration Data Request. The CSC Challenge Request that is sent by the MS may be similar to the OATS-based CSC Challenge Request. Following step S.204, an OATS-based CSC Challenge Response is sent by the BMI at step S.208 in response to the CSC Challenge Request from the MS, and then a Configuration Data Response is sent at step S.212. While the OATS-based CSC Challenge Request and the CSC Challenge Response are not modified, the standard Configuration Data Response message for OATS is modified, according to the present invention, with new information elements so that the mobile station can provide, for example, information to the BMI on the currently stored intelligent roaming information (i.e., Band Info and SAL). Table 3A shows an exemplary configuration of the modified Configuration Data Response, and Table 3B illustrates exemplary parameter type codes for the optional information elements in the Configuration Data Response of Table 3A, in accordance with an aspect of the invention. In Table 3A, and the subsequent tables, the "*" represents that the maximum bit length or range of the bit length is only limited by the defined length of the overall application layer message.

TABLE 3A

Configuration Data Response

| Information Element | Type | Length |
|---|---|---|
| Message Type | M | 6 |
| Remaining Length (in Octets) | M | 8 |
| NAM Configuration Data Block | O | 8 or 212–648 |
| Non-Public Configuration Data Block | O | 12–* |
| System Operator Code (SOC) | O | 16 |
| Index Code | O | 36 |
| BandInfo | O | 27 |
| SystemAccessList | O | 35–* |

TABLE 3B

Parameter Codes for Optional Information Elements

| Parameter Type | Code |
|---|---|
| NAM Configuration Data Block | 0001 |
| Non-Public Configuration Data Block | 0010 |
| System Operator Code (SOC) | 0011 |
| Index Code | 0100 |
| BandInfo | 0101 |
| SystemAccessList | 0110 |

As shown in Table 3A, the Configuration Data Response message of the present invention is similar to the Configuration Data Response for OATS except that for the invention a Band Info information element and a System Access List information element are also included in the message. The Band Info information element may contain data that identifies, for example, the home band and the secondary band, as well as other data to support intelligent roaming. The System Access List information element may contain SAL data entries for the mobile station to use in identifying the preferred system(s) to access in an intelligent roaming mode. Examples of the data fields for the Band Info and System Access List information elements are provided below with reference to Tables 5 and 10, respectively. Exemplary parameter type codes that may be used for the optional information elements of the Configuration Data Response of Table 3A are provided in Table 3B. As shown in Table 3B, new parameter type codes may be provided for the Band Info and the System Access List information elements.

Referring to FIG. 8, after the Configuration Data Response message has been sent to the BMI, a Download Request message is sent to the MS at step S.216. The Download Request message is sent to the mobile station in order to download specific configuration data. According to the present invention, the Download Request message may be modified to include the Band Info and System Access List information elements. An example of the modified Download Request Message is shown in Table 4A, and Table 4B includes exemplary parameter type codes that may be used for the optional information elements in the Download Request message of Table 4A.

TABLE 4A

Download Request

| Information Element | Type | Length |
| --- | --- | --- |
| Message Type | M | 6 |
| Remaining Length (in Octets) | M | 8 |
| NAM Download | O | * |
| Non-Public Download | O | * |
| BandInfo | O | 26 |
| SystemAccessList | O | 35–* |

TABLE 4B

Parameter Codes for Optional Information Elements

| Parameter Type | Code |
| --- | --- |
| NAM Download | 0001 |
| Non-Public Download | 0010 |
| BandInfo | 0011 |
| SystemAccessList | 0100 |

The Band Info information element that is provided as part of the Configuration Data Response message and Download Request message may be used to identify, for example, the home band, the probability block map for the home band, and the secondary band to support the intelligent roaming capabilities of the present invention. The Band Info information element is a new OATS information element. Table 5 illustrates an example of a Band Info information element, according to an aspect of the present invention.

TABLE 5

Band Info

| Field | Length |
| --- | --- |
| Parameter Type | 4 |
| SID Alpha Tag Control | 1 |
| Home Band | 3 |
| Probability Block Map | 16 |
| Secondary Band | 3 |

In the Band Info information element, a Parameter Type code (e.g., 0011) may be included to indicate the parameter type, and a SID Alpha Tag Control field (i.e., a SAT_Ctrl field) may be included to indicate when the Home SID Alpha Tag should be displayed. If, for example, the SID Alpha Tag Control field is set to one, then the mobile station will be instructed to display the Home SID Alpha Tag. If, on the other hand, the SID Alpha Tag Control field is set to zero, the Home SID Alpha Tag will not be displayed. A Home Band field may also be provided in the Band Info information element to indicate the frequency band for the home system. Further, as shown in Table 5, a Probability Block Map field may also be provided to indicate the most likely probability blocks in which a control channel may be found by the mobile station. Tables 8 and 9 are, respectively, exemplary Home Band and Probability Block Map fields that may be utilized to implement the features of the present invention.

As further shown in Table 5, the Band Info information element may include a Secondary Band field. The Secondary Band field may be provided to identify the secondary frequency band for the mobile station to scan if no acceptable control channels can be found on the home band. The Secondary Band field may be coded in a similar manner to the Home Band field described below (see, for example, Table 8).

In response to the Download Request message from the BMI at step S.216, a Download Result message is sent at step S.220 from the MS to the BMI. In accordance with the present invention, the Download Result message may be a modified OATS message that includes a Download Result Map information element. The Download Result Map information element provides feedback to the BMI on the results of the data block downloads. Table 6A illustrates an exemplary, modified Download Result message, and Table 6B illustrates exemplary parameter type codes of the optional information elements in the Download Result message of Table 6A. In addition, Table 7 is an exemplary Download Result Map information element which may be provided as part of the Download Result message of Table 6A.

TABLE 6A

Download Result

| Information Element | Type | Length |
| --- | --- | --- |
| Message Type | M | 6 |
| Remaining Length (in Octets) | M | 8 |
| DownloadResultMap | M | 16 |
| Parameter Error | O | * |

TABLE 6B

Parameter Codes for Optional Information Elements

| Parameter Type | Code |
|---|---|
| Parameter Error | 0001 |

TABLE 7

Download Result Map

| Value | Function |
|---|---|
| XXXX XXXX XXXX XXX0 | NAM download unsuccessful |
| XXXX XXXX XXXX XXX1 | NAM download successful |
| XXXX XXXX XXXX XX0X | Non-Public download unsuccessful |
| XXXX XXXX XXXX XX1X | Non-Public download successful |
| XXXX XXXX XXXX X0XX | Band Info download unsuccessful |
| XXXX XXXX XXXX X1XX | Band Info download successful |
| XXXX XXXX XXXX 0XXX | System Access List download unsuccessful |
| XXXX XXXX XXXX 1XXX | System Access List download successful |

All other values may be reserved

After step S.220 in FIG. 8, the subsequent OATS messages may be sent in standardized format to complete the over-the-air programming of the mobile station. That is, at step S.224, a NAM Commit Result message may be sent from the BMI to the MS, and then a CSC Challenge Request message may be sent at step S.228 from the MS to the BMI. Thereafter, at step S.232, a CSC Challenge Response message may be sent to the MS, and then a NAM Commit Result may be sent from the MS to the BMI in step S.236. At this point, the SAL and other intelligent roaming data is updated in the memory of the MS, and the MS may proceed to perform intelligent roaming with the updated information.

As described above, the message flow for over-the-air programming of the mobile station may be achieved by utilizing new information elements that are sent based on an OATS message flow. According to an aspect of the present invention, the existing OATS messages that are modified to include these new information elements include, for example, the Configuration Data Request message, the Configuration Data Response message, the Download Request message and the Download Result message, as described above. The new and modified OATS information elements that are provided include, for example, the Band Info information element, which is described above with reference to Table 5, the Configuration Data Block Map information element, which is described above with reference to Table 2, and the Download Result Map information element, which is described above with reference to Table 7. Other new information elements and fields may also be provided to implement the intelligent roaming capabilities of the present invention. Examples of these information elements and fields are discussed below with reference to Tables 8–15.

Table 8 illustrates an exemplary list of coded values for the Home Band field, which may be provided as one of the fields in the Band Info information element (see, for example, Table 5). As discussed above, the Home Band field may indicate the frequency band for the home system of the mobile station. The Home Band field may be three bits in length and assigned one of a plurality of coded values to indicate the frequency band of the home network provider. As shown in Table 8, values may be assigned for both cellular A and B bands, as well as for 1900 MHz PCS bands.

TABLE 8

Home Band

| Value | Function |
|---|---|
| 000 | 800 MHz A Band |
| 001 | 800 MHz B Band |
| 010 | 1900 MHz A Band |
| 011 | 1900 MHz B Band |
| 100 | 1900 MHz C Band |
| 101 | 1900 MHz D Band |
| 110 | 1900 MHz E Band |
| 111 | 1900 MHz F Band |

Table 9 illustrates an exemplary coding of values for the Probability Block Map field. The Probability Block Map field may be provided as one of the fields in the Band Info information element, as discussed above with reference to Table 5. The Probability Block Map field indicates the most likely probability blocks in which a control channel may be found by the mobile station. The probability block members may be defined in accordance with Interim Standard 136.1 (IS-136.1), Revision A, Section 6.3.1.1.1 for each frequency band. For more information on IS-136.1, see for example TIA/EIA-IS-136.1-A, *TDMA Cellular/PCS- Radio Interface-Mobile Station-Base Station Compatibility-Digital Control Channel*, Telecommunications Industry Association, October 1996, the disclosure of which is expressly incorporated herein by reference in its entirety.

TABLE 9

Probability Block Map

| Value | | Function |
|---|---|---|
| 1XXX | XXXX | 1st probability block likely to contain control channels |
| XXXX | XXXX | |
| 0XXX | XXXX | 1st probability block unlikely to contain control channels |
| XXXX | XXXX | |
| . | . | . |
| . | . | . |
| XXXX | XXXX | 16th probability block likely to contain control channels |
| XXXX | XXX1 | |
| XXXX | XXXX | 16th probability block unlikely to contain control channels |
| XXXX | XXX0 | |

Table 10 illustrates the various fields that may be provided for the System Access List information element. As discussed above, the System Access List information element may be included in the Configuration Data Response message (see step S.212) and the Download Request message (see step S.216). The System Access List information element may contain SAL entries for the mobile station to use in identifying the preferred system to access when in an intelligent roaming mode. As shown in Table 10, the System Access List information element may include a field to indicate the number of SAL entries that are present (e.g., a Number of Target Systems field), and may include one or more SAL entries that are provided for each SID included in the System Access List information element. The System Access List information element may also include a coded Parameter Type field (e.g., 0100) to indicate the parameter type. Table 11 illustrates an example of the fields for an SAL entry, which is used to indicate the target or preferred systems for the mobile station when roaming.

TABLE 10

System Access List

| Field | Length |
| --- | --- |
| Parameter Type | 4 |
| Number of SAL Entries (S) | 7 |
| SAL Entry (S + 1 instances of this field are present) | (S + 1) × (24 + 40 × T) |

TALBE 11

SAL Entry

| Field | Length |
| --- | --- |
| Current SID | 15 |
| Roam Indicator | 1 |
| Scan Method | 2 |
| Scan Time | 2 |
| Number of Target Systems (T) | 4 |
| Target System Info (T instances of this field are present) | (40 × T) |

As shown in Table 11, each SAL entry may include a Current SID field to indicate the current SID that the entry is associated with, a Roam Indicator field to indicate the status of the roam indicator, a Scan Method field to indicate the scan method to be utilized by the mobile station, a Scan Time field to indicate the scan time, a Number of Target Systems field to indicate the number of preferred or target systems, and a Target System Info field for each target system. Each SAL entry may be accessed by the mobile station by looking up the SID of the current system and comparing it with the Current SID field of each entry in the System Access List until a match is found. The Roam Indicator field may be used in each SAL entry to indicate whether the roam indicator should be displayed by the mobile station for the current system. For example, when the Roam Indicator field is set to one, this field will indicate that the mobile station should display the roam indicator. If, however, the Roam Indicator field is set to zero, the roam indicator should not be displayed by the mobile station.

The Scan Method field of each SAL entry may indicate how the mobile station should scan for a target system. Table 12 illustrates an example of the coded values that may be assigned to the Scan Method bit field, as well as the related function for each coded value. If, for example, the Scan Method field has a value of zero, then the mobile station should perform a continuous scan until it finds a target system. If, on the other hand, the Scan Method field is equal to one, then the mobile station should obtain service on the current SID and scan for target or preferred systems periodically.

TABLE 12

Scan Method

| Value | Function |
| --- | --- |
| 00 | Continuous scan until find a target system |
| 01 | Obtain service on current SID and scan for target systems periodically |
| All other values may be reserved | |

The Scan Time field of each SAL entry indicates the approximate interval between scans for a target system. Table 13 illustrates various coded values that may be assigned to the Scan Time field. The scan time interval may be set based upon various factors, including the operating conditions of the mobile station. For example, the battery power of the mobile station may effect the scan time interval, such that a longer scan time interval may be desirable to reduce the number of required scans and consumption of the battery. By way of a non-limiting example, a scan time interval of two and one-half or five minutes may be utilized. As shown in the embodiment of Table 13, if the Scan Time field is set to zero, then the scan time will be set such that the mobile station will perform a scan every two and one-half minutes. If the scan time is set to one, then a longer scan time may be used by the mobile station. For example, in Table 13, a scan time field value of one would cause the mobile station to perform a periodical scan every five minutes.

TABLE 13

Scan Time

| Value | Function |
| --- | --- |
| 00 | Periodically scan every 2 1/2 minutes |
| 01 | Periodically scan every 5 minutes |
| All other values may be reserved | |

As noted above, each SAL entry may include a field to indicate the number of target systems (i.e., a Number of Target Systems field), and a field to indicate the target system information for each target system (i.e., a Target System Info field). Target system information may be provided for each target or preferred system that exists for the current SID. The number of target systems for a current SID will vary depending upon, for example, the reciprocal agreements or billing arrangements that the home network provider has with providers for the current SID. Table 14 illustrates an exemplary Target System Info field and the information that may be included in the Target System Info field.

TABLE 14

Target System Info

| Field | Length |
| --- | --- |
| Target Band | 3 |
| Technology Map | 5 |
| Target SID | 15 |
| Roam Indicator | 1 |
| Probability Block Map | 16 |

As shown in Table 14, the Target System Info may include a Target Band field which identifies the frequency band for a target or preferred system. The Target Band field may be coded in a similar manner to the Home Band field (see, for example, Table 8). A field to indicate the SID of the target system (i.e., a Target SID field), as well as a field to indicate the roam indicator display status for the target system (i.e., a Roam Indicator field) may also be provided. The Roam Indicator field of the Target System Info may indicate to the mobile station when a roaming status indication should be displayed when service is obtained on a particular target system. When the Roam Indicator field is set to one, for example, this field may indicate that the mobile station should display the roaming status indication. Otherwise, if the value of the Roam Indicator field is set to zero, the roaming status indication should not be displayed by the mobile station.

As part of the target system information in the Target System Info data block, a Technology Map field may also be provided. The Technology Map field may identify the air-interface technologies (e.g., EIA/TIA-553 (AMPS), IS-136, PCS-1900, etc.) and/or other technologies associated with a particular frequency band of a given target system. Table 15 illustrates examples of the various coded values that the Technology Map field may be assigned to indicate a particular air-interface technology. In the embodiment of Table 15, the unassigned bit values may be held in reserve for future systems or applications (e.g., they could be assigned to PACS, CDMA, or other technologies).

TABLE 15

| | | Technology Map | |
|---|---|---|---|
| | Value | | Function |
| X | XXX1 | | EIA/TIA-553 (AMPS) |
| X | XX1X | | IS-136 |
| X | X1XX | | PCS-1900 |
| All other values may be reserved | | | |

Other information relating to each target or preferred system may also be provided as part of the information fields for the Target System Info. For example, a Probability Block Map field may be provided to indicate the most likely probability blocks in which a control channel may be found. An example of the manner in which a Probability Block Map field may be coded is provided above with reference to Table 9.

In accordance with another embodiment of the present invention, the SAL and intelligent roaming information may be downloaded and programmed into the mobile station by embedding the over-the-air programming messages within the SOC Specific Request message defined for OATS. According to this embodiment, the BMI will send the SOC Specific Request message to the mobile station (MS), and the MS will respond with the R-DATA ACCEPT message. FIG. 9 illustrates an example of the message flows between the MS and the BMI for over-the-air programming of the mobile station in accordance with this embodiment of the present invention.

In the embodiment of FIG. 9, the intelligent roaming data will only be committed to memory in the mobile station following a NAM Commit Request message from the BMI, and a successful CSC Challenge. If needed, multiple SOC Specific Request messages may be sent to the MS prior to a NAM Commit Request in order to program all of the intelligent roaming data.

At step S.300 in FIG. 9, an SOC Specific Request message is sent from the BMI to the MS. The SOC Specific Request message may be used for SOC Specific Data. Table 16 illustrates an example of the information elements that may be included in each SOC Specific Request message. As shown in Table 16, the SOC Specific Request message may be configured according to the existing message defined for OATS.

TABLE 16

| SOC Specific Request | | |
|---|---|---|
| Information Element | Type | Length |
| Message Type | M | 6 |
| Remaining Length (in Octets) | M | 8 |

TABLE 16-continued

| SOC Specific Request | | |
|---|---|---|
| Information Element | Type | Length |
| System Operator Code (SOC) | M | 12 |
| SOC Specific Data | M | 0–* |

As shown in step S.304 of FIG. 9, multiple SOC Specific Request messages may be sent to the mobile station prior to the NAM Commit Request, in order to program all of the necessary intelligent roaming data. Each SOC Specific Request message may be used for SOC Specific Data. The SOC Specific Data may be provided as an information element in each of the SOC Specific Request messages. Table 17A illustrates the various information elements and coded contents that may be provided as the SOC Specific Data. When messages are sent, the SOC may be set to a particular code corresponding to the service provider (e.g., 004 hex). The SOC Specific Data may include the Band Info and the System Access List information elements, similar to that described above (see, for example, Tables 5, 10 and 11). Table 17B illustrates an example of the parameter type codes for the optional information elements in the SOC Specific Data information element of Table 17A.

TABLE 17A

| SOC Specific Data | | |
|---|---|---|
| Information Element | Type | Length |
| Band Info | O | 26 |
| System Access List | O | 35–* |

TABLE 17B

| Parameter Codes for Optional Information Elements | |
|---|---|
| Parameter Type | Code |
| Band Info | 0001 |
| System Access List | 0010 |

After all of the SOC Specific Request messages have been sent, a NAM Commit Request message may be sent from the BMI to the MS at step S.308. In response, a SOC Challenge Request message will be sent from the MS to the BMI at step S.312, and a CSC Challenge Response will be returned by the BMI to the MS at step S.316. Thereafter, as shown in FIG. 9, a NAM Commit Result message will be sent at step S.320 from the MS to the BMI to confirm the programming of the intelligent roaming data to the mobile station.

Various techniques and network architectures may be utilized for administering, programming and updating each mobile station with the SAL and other intelligent roaming information. For example, a main or centralized database could be established to implement the various aspects of the present invention. Such a centralized database could include information on all of the network systems that the home service provider owns, as well as information on all the systems with which the service provider has preferred roaming agreements or billing arrangements. Entries in the database could encompass, for example, all of the information that is provided to the mobile station as part of the over-the-air programming of the mobile station. Other information could also be included in such a centralized database.

For example, the centralized database could contain for each entry in the SAL, the name of the cellular service provider for each target or preferred system, a contact, and roaming agreement information.

Figure 10:
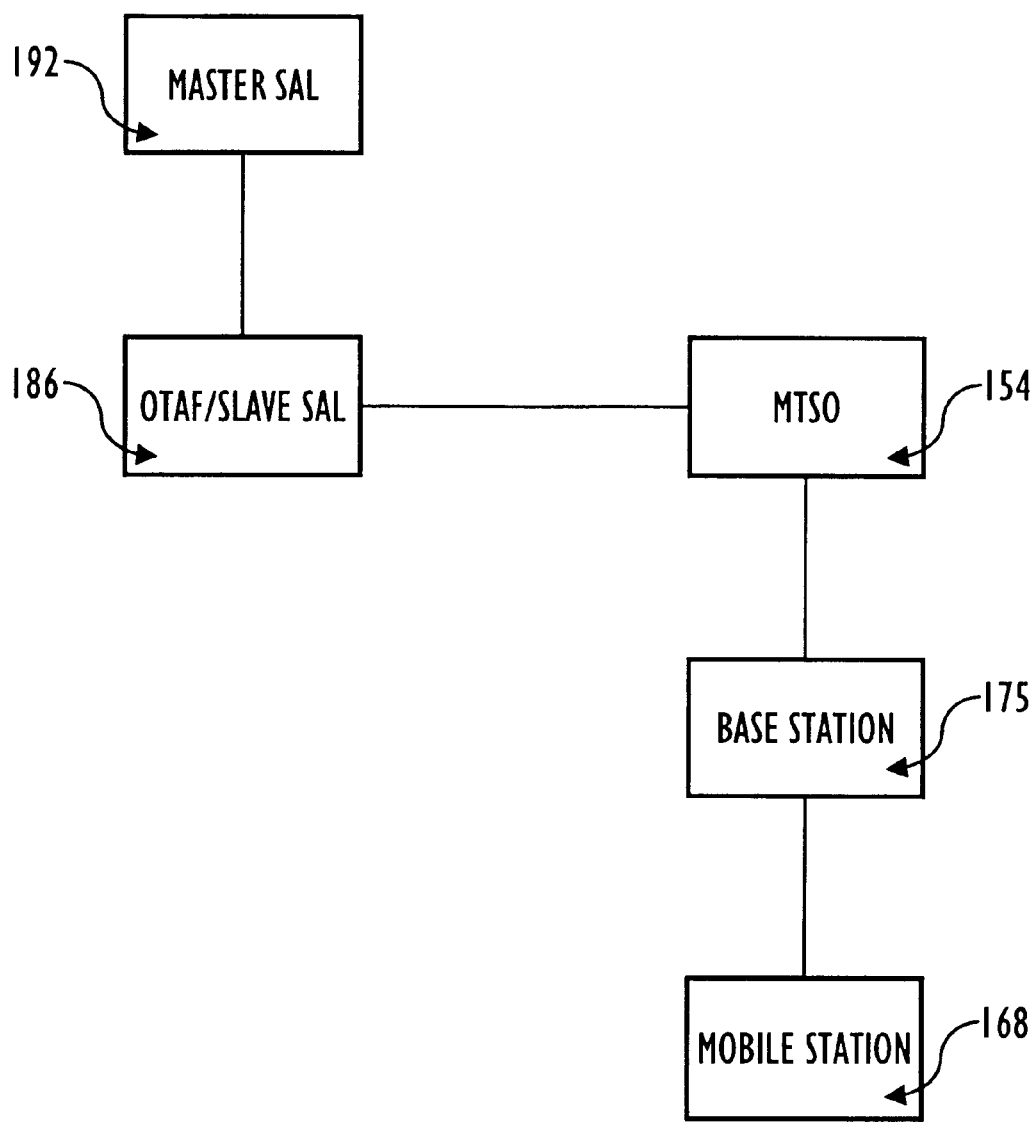
FIG. 10 is a general block diagram of an exemplary network architecture for implementing and administering the intelligent roaming capabilities of the invention.

In accordance with another aspect of the present invention, FIG. 10 illustrates an exemplary network architecture for implementing and administering the intelligent roaming capabilities and features of the present invention. In the embodiment of FIG. 10, a mobile station 168 receives SAL information via a centralized or master SAL database 192 that has one or more slave SAL database arrangements 186. The master SAL 192 may be administered centrally by an operator and may contain SAL information and other intelligent roaming information for all of the systems that the service provider owns, and all of the systems with which the service provider has preferred roaming agreements. The master SAL 192 may comprise a computer or workstation with memory, and a database application for storing all of the SAL information and other intelligent roaming information. The master SAL 192 may also include a database that indicates all of the mobile stations supporting the intelligent roaming capabilities of the present invention.

Each of the slave SALs 186 may comprise logical entities within, for example, an Over-The-Air Activation Function (OTAF). The OTAF may comprise a software application residing on a computer or workstation, and be adapted to store and forward information to be programmed into the mobile stations. The master SAL 192 may update all OTAF/slave SALs 186 with new information concerning target or preferred systems as required or as information becomes available. When the master SAL 192 is updated with new SAL information, each of the OTAF/slave SALs 186 may receive the information from the master SAL 192 through, for example, a Transmission Control Protocol/Internet Protocol (TCP/IP) connection, format the information for the mobile stations, and send the formatted information to the mobile stations through the cellular or PCS network. Along with the new SAL information sent from the master SAL 192, a list of the mobile stations requiring updating may be sent to all OTAF/slave SALs 186. Each of the OTAF/slave SALs 186 would then be responsible for updating the mobile stations, and may keep track of the mobile stations that have been updated with new intelligent roaming information and those that still require updating. Each of the mobile stations may be identified by its Mobile Identification Number (MIN) or International Mobile Station Identity (IMSI). The mobile station identity may also identify the mobile station's Home Location Register (HLR).

As noted above, each of the OTAF/slave SALs 186 may send the formatted information to the mobile stations through the cellular or PCS network. The Base Station/Mobile Switching Center/Inter-Working Function (BMI) may be used to transfer the information to the mobile stations. When information is received from the master SAL 192, the OTAF/slave SAL 186 may send, for example, an Interim Standard 41C (IS-41C) message to the mobile station's HLR to determine the location of the mobile station. The HLR may then respond with an address for the serving systems's MSC or MTSO (such as MTSO 154). As illustrated in FIG. 10, the OTAF/slave SAL 186 may then communicate over-the-air programming messages for the mobile station, such as mobile station 168, via MTSO 154 using the IS-41C SMS Delivery Point-to-Point (SMDPP) message. The MTSO 154 may then repackage the over-the-air message into, for example, an Interim Standard 136 (IS-136) R-DATA message for delivery to the mobile station 168 through an appropriate base station or cell site 175.

Feedback may be provided by the serving MTSO 154 to the OTAF/slave SAL 186 (e.g., in the form of another IS-41C message) to indicate whether the information successfully reached the mobile station. If the information was not successfully delivered to the mobile station, the OTAF/slave SAL 186 could trigger a retry mechanism to resend the information.

Other features may be provided for administering and implementing the intelligent roaming capabilities of the present invention. For example, as an alternative to the embodiment of FIG. 10, the home network system could broadcast a code indicating when the central SAL database was last updated. Based on this code, mobile stations could then determine periodically if they have the most current SAL information. When it is determined that the SAL information contained in the mobile station is not current, the mobile station could request reprogramming by sending a request message using, for example, OATS message protocols.

While the invention has been described with reference to several exemplary embodiments, it is understood that the words which have been used herein are words of description and illustration, rather than words of limitations. Changes may be made, within the purview of the appended claims, as presently stated and as amended, without departing from the scope and spirit of the invention in its aspects.

For example, although a mobile station-based approach has been disclosed for implementing the intelligent roaming features and capabilities of the present invention, other approaches and methods may be utilized to achieve and implement the various aspects of the present invention. For example, the present invention may be implemented through a network-based approach, whereby SAL and preferred system information is directed from a serving network to the mobile station in order to obtain service on the preferred system. In such a case, some or most of the "intelligence" may be provided in the network to facilitate roaming by the mobile station.

Further, although embodiments for over-the-air programming of the SAL have been discussed with reference to OATS, over-the-air programming may be implemented as a different or separate teleservice. For example, over-the-air programming may be developed and standardized as a completely new teleservice, or it may be developed as a carrier-specific teleservice. In addition, various over-the-air activation methods or teleservices, including OATS, may be utilized in order to activate new mobile station users. For example, activation information may be programmed in the mobile station using the Digital Control Channel (DCCH) that is associated with IS-136, or an appropriate signaling channel to communicate with a cellular network when not on a voice or data call. Alternatively, the activation information may be programmed in the mobile station using a Digital Traffic Channel (DTC), or an appropriate digital voice or data channel to communicate with a cellular network. If over-the-air activation is performed on the DCCH or the DTC, the new mobile station user may be required to initiate a call to a Customer Service Center (CSC), and to follow a predetermined set of procedures to perform over-the-air activation of the mobile station.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. An intelligent roaming process for enabling a mobile station to locate a preferred system within a communication network when a home system of said mobile station is not available, said communication network comprising a plurality of service areas, each of said service areas being assigned a system identification number, said intelligent roaming process comprising:

accessing, when said home system is not available, a system access list (SAL) stored in said mobile station, said SAL containing one or more system identification numbers and one or more pre-stored frequency bands, corresponding to each said one or more system identification numbers, where the mobile station should attempt to obtain service, said frequency bands being in a priority order;

comparing a system identification number of said current service area to said one or more system identification number contained in said SAL to determine if a preferred system exists for said current service area; and identifying, when a preferred system is determined to exist for said current service area, a frequency band, based on a priority order, where said mobile station can locate said preferred system for said current service area.

2. An intelligent roaming process according to claim 1, wherein said comparing comprises comparing said one or more system identification number contained in said SAL with said system identification number of said current service area and determining that a preferred system exists when one of said system identification number contained in said SAL corresponds to said system identification number of said current service area.

3. An intelligent roaming process according to claim 2, wherein said identifying identifies, when it is determined that a preferred system exists for said current service area, the frequency band of said preferred system from said one of said one or more system identification number contained in said SAL that corresponds to said system identification number of said current service area.

4. An intelligent roaming process according to claim 2, wherein said comparing comprises determining that a preferred system does not exist for said current service area when said system identification number of said current service area does not correspond to a system identification number of any of said one or more system identification number contained in said SAL, said process further comprising indicating that no service is available when it is determined that a preferred system does not exist for said current service area.

5. An intelligent roaming process according to claim 2, wherein said SAL further comprises air interface technology information that indicates the air interface technology used by said preferred system.

6. An intelligent roaming process according to claim 1, further comprising scanning, after said frequency band of said preferred system for said current service area is identified, said identified frequency band in order to obtain service on said preferred system for said current service area.

7. An intelligent roaming process according to claim 1, further comprising detecting said system identification number of said current service area within which said mobile station is located, and determining whether said home system is available based on said system identification number of said current service area.

8. An intelligent roaming process according to claim 7, wherein said detecting comprises scanning a home frequency band for said control channel and additionally scanning, when said control channel is not located on said home frequency band, a secondary frequency band where said mobile station can locate said control channel.

9. An intelligent roaming process according to claim 7, wherein said determining comprises comparing said system identification number of said current service area to a home system identification number associated with said home system and determining that said home system is available when said system identification number of said current service area corresponds to said home system identification number.

10. An intelligent roaming process according to claim 1, further comprising programming said mobile station with said SAL over-the-air with a wireless interface, said over-the-air programming including storing said SAL in a memory of said mobile station.

11. An intelligent roaming process according to claim 10, wherein said over-the-air programming comprises transmitting SAL information as information elements that are made part of an Over-the-Air Activation Teleservice (OATS).

12. An intelligent roaming process according to claim 10, wherein said over-the-air programming comprises embedding SAL information within a System Operator Code (SOC) Specific Request message defined for an Over-the-Air Activation Teleservice (OATS).

13. An intelligent roaming process according to claim 1, wherein said SAL comprises information indicating at least one frequency block to search for a control channel associated with said preferred system, said process further comprising scanning said at least one frequency block to locate said preferred system for said current service area.

14. An intelligent roaming process according to claim 1, wherein said SAL comprises time scan information indicating an interval time between periodic scans for a preferred system, said process further comprising periodically scanning for a preferred system identified by said SAL in accordance with said time scan information.

15. An intelligent roaming process according to claim 1, wherein said SAL comprises system name information including a service provider name of said preferred system, and roam indicator information indicating when said system name information is to be displayed by said mobile station.

16. A process for selecting a preferred system within a communication network when a home system is not available to a mobile station, said communication network comprising a plurality of service areas, each of said service areas being assigned a system identification number, said process comprising:

scanning a home band to locate a control channel;

obtaining, when said control channel is located, a system identification number corresponding to a current service area in which said mobile station is located;

determining whether said home system is available based on said system identification number of said current service area;

accessing, when said home system is not available, a system access list (SAL) stored in said mobile station, said SAL comprising a plurality of pre-stored entries indicating a system identification number and one or more corresponding frequency bands for each preferred system, said one or more corresponding frequency bands being in a priority order;

comparing said system identification number of said current service area to said entries of said SAL to determine whether a preferred system exists for said current service area, and determining that a preferred system exists when a system identification number of one of said entries corresponds to said system identification number of said current service area; and identifying, from said one of said entries of said SAL that corresponds to said system identification number of said current service area, one of said one or more corresponding frequency bands where said mobile station can locate a preferred system for said current service area based on the priority order of said one or more corresponding frequency bands.

17. A process for selecting a preferred system according to claim 16, further comprising scanning, when a current frequency band in which said control channel is located does not correspond to said identified frequency band of said preferred system, said identified frequency band to obtain service on said preferred system for said current service area.

18. A process for selecting a preferred system according to claim 17, further comprising obtaining service on said current frequency band when said current frequency band corresponds to said identified frequency band of said preferred system for said current service area.

19. A process for selecting a preferred system according to claim 16, wherein said comparing comprises determining that a preferred system does not exist for said current service area when said system identification number of said current service area does not correspond to a system identification number of any of said entries of said SAL, said process further comprising indicating that no service is available when it is determined that a preferred system does not exist for said current service area.

20. A process for selecting a preferred system according to claim 16, wherein said entries of said SAL further comprise air interface technology information that indicates the air interface technology used by said preferred system.

21. A process for selecting a preferred system according to claim 16, wherein said scanning comprises additionally scanning, when said control channel is not located on said home band, a secondary band where said mobile station can locate said control channel.

22. A process for selecting a preferred system according to claim 16, wherein said determining comprises comparing said system identification number of said current service area to a home system identification number associated with said home system and determining that said home system is available when said system identification number of said current service area corresponds to said home system identification number.

23. A process for selecting a preferred system according to claim 16, further comprising obtaining service from said home system when it is determined that said home system is available.

24. A process for selecting a preferred system according to claim 16, further comprising programming said mobile station with said SAL over-the-air with a wireless interface, said over-the-air programming including storing said SAL in a memory of said mobile station.

25. A process for selecting a preferred system according to claim 24, wherein said over-the-air programming comprises transmitting SAL information as information elements that are made part of an Over-the-Air Activation Teleservice (OATS).

26. A process for selecting a preferred system according to claim 24, wherein said over-the-air programming comprises embedding SAL information within a System Operator Code (SOC) Specific Request message defined for an Over-the-Air Activation Teleservice (OATS).

27. A process for selecting a preferred system according to claim 16, wherein said SAL further comprises information indicating at least one frequency block to search for a control channel of said preferred system, said process further comprising scanning said at least one frequency block to locate said preferred system for said current service area.

28. A process for selecting a preferred system according to claim 16, wherein said SAL further comprises time scan information indicating an interval time between periodic scans for a preferred system, said process further comprising periodically scanning for a preferred system identified by said SAL in accordance with said time scan information.

29. A process for selecting a preferred system according to claim 16, wherein said SAL further comprises system name information including a service provider name of said preferred system, and roam indicator information indicating when said system name information is to be displayed by said mobile station.

30. An intelligent roaming system for enabling a mobile station to locate a preferred system within a communication network when a home system of said mobile station is not available, said communication network comprising a plurality of service areas, each of said service areas being assigned a system identification number, said intelligent roaming system comprising:

an accessing system for accessing, when said home system is not available, a system access list (SAL) stored in said mobile station, said SAL containing one or more system identification number and one or more pre-stored frequency bands, corresponding to each said one or more system identification number, where the mobile station should attempt to obtain service, said frequency bands being in a priority order;

a comparing system for comparing said system identification number of said current service area to said one or more system identification number contained in said SAL to determine if a preferred system exists for said current service area; and an identifying system for identifying, when a preferred system is determined to exist for said current service area, a frequency band where said mobile station can locate said preferred system for said current service area based on the priority order of said one or more pre-stored frequency bands.

31. An intelligent roaming system according to claim 30, wherein said SAL comprises a plurality of entries indicating a system identification number and corresponding frequency band for each preferred system, said comparing system comprising a system for searching said entries of said SAL based on said system identification number of said current service area and a system for determining that a preferred system exists when a system identification number of one of said entries corresponds to said system identification number of said current service area.

32. An intelligent roaming system according to claim 31, wherein said identifying system identifies, when it is determined that a preferred system exists for said current service area, the frequency band of said preferred system from said one of said entries of said SAL that corresponds to said system identification number of said current service area.

33. An intelligent roaming system according to claim 31, wherein said comparing system comprises a system for determining that a preferred system does not exist for said current service area when said system identification number of said current service area does not correspond to a system identification number of any of said entries of said SAL, said system further comprising a system for indicating that no service is available when it is determined that a preferred system does not exist for said current service area.

34. An intelligent roaming system according to claim 31, wherein said entries of said SAL further comprise air interface technology information that indicates the air interface technology used by said preferred system.

35. An intelligent roaming system according to claim 30, further comprising a system for scanning, after said frequency band of said preferred system for said current service area is identified, said identified frequency band in order to obtain service on said preferred system for said current service area.

36. An intelligent roaming system according to claim 30, further comprising a system for detecting said system identification number of said current service area within which said mobile station is located, and a system for determining whether said home system is available based on said system identification number of said current service area.

37. An intelligent roaming system according to claim 36, wherein said detecting system comprises a system for scanning a home frequency band for said control channel and system for additionally scanning, when said control channel is not located on said home frequency band, a secondary frequency band where said mobile station can locate said control channel.

38. An intelligent roaming system according to claim 36, wherein said determining system comprises a system for comparing said system identification number of said current service area to a home system identification number associated with said home system and a system for determining that said home system is available when said system identification number of said current service area corresponds to said home system identification number.

39. An intelligent roaming system according to claim 30, wherein said mobile station comprises a mobile phone and said communications network comprises one of a cellular communications network and a Personal Communications Services (PCS) network.

40. An intelligent roaming system according to claim 30, further comprising a system for programming said mobile station with said SAL over-the-air with a wireless interface, said over-the-air programming system including a system for storing said SAL in a memory of said mobile station.

41. An intelligent roaming system according to claim 40, wherein said over-the-air programming system further comprises a system for transmitting SAL information as information elements that are made part of an Over-the-Air Activation Teleservice (OATS).

42. An intelligent roaming system according to claim 40, wherein said over-the-air programming system further comprises a system for embedding SAL information within a System Operator Code (SOC) Specific Request message defined for an Over-the-Air Activation Teleservice (OATS).

43. An intelligent roaming system according to claim 30, wherein said SAL comprises information indicating at least one frequency block to search for a control channel of said preferred system, said intelligent roaming system further comprising a system for scanning said at least one frequency block to locate said preferred system for said current service area.

44. An intelligent roaming system according to claim 30, wherein said SAL comprises time scan information indicating an interval time between periodic scans for a preferred system, said intelligent roaming system further comprising a system for periodically scanning for a preferred system identified by said SAL in accordance with said time scan information.

45. An intelligent roaming system according to claim 30, wherein said SAL comprises system name information including a service provider name of said preferred system, and roam indicator information indicating when said system name information is to be displayed by said mobile station.

46. A system for selecting a preferred system within a communication network when a home system is not available to a mobile station, said communication network comprising a plurality of service areas, each of said service areas being assigned a system identification number, said system comprising:

a scanning system for scanning a home band to locate a control channel;

an obtaining system for obtaining, when said control channel is located, a system identification number corresponding to a current service area in which said mobile station is located;

a determining system for determining whether said home system is available based on said system identification number of said current service area;

an accessing system for accessing, when said home system is not available, a system access list (SAL) stored in said mobile station, said SAL comprising a plurality of pre-stored entries indicating one or more system identification numbers and one or more corresponding frequency bands for each preferred system, said one or more corresponding frequency bands being in a priority order;

a comparing system for comparing said system identification number of said current service area to said pre-stored entries of one or more system identification numbers contained in said SAL to determine whether a preferred system exists for said current service area; and an identifying system for identifying, from one of said entries of said SAL that corresponds to said system identification number of said current service area, one of said one or more corresponding frequency bands where said mobile station can locate a preferred system for said current service area based on the priority order of said one or more corresponding frequency bands.

47. A system for selecting a preferred system according to claim 46, wherein said comparing system comprises a system for determining that a preferred system exists when a system identification number of one of said entries corresponds to said system identification number of said current service area.

48. A system for selecting a preferred system according to claim 46, further comprising a system for scanning, when a current frequency band in which said control channel is located does not correspond to said identified frequency band of said preferred system, said identified frequency band to obtain service on said preferred system for said current service area.

49. A system for selecting a preferred system according to claim 48, further comprising a system for obtaining service on said current frequency band when said current frequency band corresponds to said identified frequency band of said preferred system for said current service area.

50. A system for selecting a preferred system according to claim 46, wherein said comparing system comprises a system for determining that a preferred system does not exist for said current service area when said system identification number of said current service area does not correspond to a system identification number of any of said entries of said SAL, said system further comprising a system for indicating that no service is available when it is determined that a preferred system does not exist for said current service area.

51. A system for selecting a preferred system according to claim 46, wherein said entries of said SAL further comprise air interface technology information that indicates the air interface technology used by said preferred system.

52. A system for selecting a preferred system according to claim 46, wherein said scanning system comprises a system for additionally scanning, when said control channel is not located on said home band, a secondary band where said mobile station can locate said control channel.

53. A system for selecting a preferred system according to claim 46, wherein said determining system comprises a system for comparing said system identification number of said current service area to a home system identification number associated with said home system and a system for determining that said home system is available when said system identification number of said current service area corresponds to said home system identification number.

54. A system for selecting a preferred system according to claim 46, further comprising a system for obtaining service from said home system when it is determined that said home system is available.

55. A system for selecting a preferred system according to claim 46, wherein said mobile station comprises a mobile phone and said communications network comprises one of a cellular communications network and a Personal Communications Services (PCS) network.

56. A system for selecting a preferred system according to claim 46, further comprising a system for programming said mobile station with said SAL over-the-air with a wireless interface, said over-the-air programming system including a system for storing said SAL in a memory of said mobile station.

57. A system for selecting a preferred system according to claim 56, wherein said over-the-air programming system further comprises a system for transmitting SAL information as information elements that are made part of an Over-the-Air Activation Teleservice (OATS).

58. A system for selecting a preferred system according to claim 56, wherein said over-the-air programming system further comprises a system for embedding SAL information within a System Operator Code (SOC) Specific Request message defined for an Over-the-Air Activation Teleservice (OATS).

59. A system for selecting a preferred system according to claim 46, wherein said SAL further comprises information indicating at least one frequency block to search for a control channel of said preferred system, said system for selecting further comprising a system for scanning said at least one frequency block to locate said preferred system for said current service area.

60. A system for selecting a preferred system according to claim 46, wherein said SAL comprises time scan information indicating an interval time between periodic scans for a preferred system, said system for selecting further comprising a system for periodically scanning for a preferred system identified by said SAL in accordance with said time scan information.

61. A system for selecting a preferred system according to claim 46, wherein said SAL comprises system name information including a service provider name of said preferred system, and roam indicator information indicating when said system name information is to be displayed by said mobile station.

62. An intelligent roaming process according to claim 1, further comprising analyzing scan method information in said SAL when more than one preferred system is determined to exist for said current service area, and instructing said mobile station to scan for the preferred systems in accordance with said scan method information.

63. An intelligent roaming process according to claim 62, wherein said mobile station is instructed, in accordance with said scan method information, to scan for the preferred systems determined for said current service area until one of the preferred systems is located.

64. An intelligent roaming process according to claim 62, wherein said mobile station is instructed, in accordance with said scan method information, to obtain service on the current system for said current service area before periodically scanning for the preferred systems for said current service area.

65. A process for selecting a preferred system according to claim 16, further comprising analyzing scan method information in said SAL when more than one preferred system is determined to exist for said current service area, and instructing said mobile station to scan for the preferred systems in accordance with said scan method information.

66. A process for selecting a preferred system according to claim 65, wherein said mobile station is instructed, in accordance with said scan method information, to scan for the preferred systems determined for said current service area until one of the preferred systems is located.

67. A process for selecting a preferred system according to claim 65, wherein said mobile station is instructed, in accordance with said scan method information, to obtain service on the current system for said current service area before periodically scanning for the preferred systems for said current service area.

68. An intelligent roaming system according to claim 30, further comprising a system that analyzes scan method information in said SAL when more than one preferred system is determined to exist for said current service area, and a system that instructs said mobile station to scan for the preferred systems in accordance with said scan method information.

69. An intelligent roaming system according to claim 68, wherein said mobile station is instructed, in accordance with said scan method information, to scan for the preferred systems determined for said current service area until one of the preferred systems is located.

70. An intelligent roaming system according to claim 68, wherein said mobile station is instructed, in accordance with said scan method information, to obtain service on the current system for said current service area before periodically scanning for the preferred systems for said current service area.

71. A system for selecting a preferred system according to claim 46, further comprising analyzing scan method information in said SAL when more than one preferred system is determined to exist for said current service area, and instructing said mobile station to scan for the preferred systems in accordance with said scan method information.

72. A system for selecting a preferred system according to claim 71, wherein said mobile station is instructed, in accordance with said scan method information, to scan for the preferred systems determined for said current service area until one of the preferred systems is located.

73. A system for selecting a preferred system according to claim 71, wherein said mobile station is instructed, in accordance with said scan method information, to obtain service on the current system for said current service area before periodically scanning for the preferred systems for said current service area.

* * * * *